(12) United States Patent
Lee et al.

(10) Patent No.: US 9,998,917 B2
(45) Date of Patent: Jun. 12, 2018

(54) ASSOCIATING A DEVICE WITH ANOTHER DEVICE'S NETWORK SUBSCRIPTION

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/606,736

(22) Filed: Jan. 27, 2015

(65) Prior Publication Data

US 2016/0021691 A1 Jan. 21, 2016

Related U.S. Application Data

(60) Provisional application No. 62/025,777, filed on Jul. 17, 2014, provisional application No. 62/025,398, filed on Jul. 16, 2014.

(51) Int. Cl.
*H04W 4/00* (2018.01)
*H04W 12/04* (2009.01)
(Continued)

(52) U.S. Cl.
CPC ......... *H04W 12/04* (2013.01); *H04L 63/0853* (2013.01); *H04L 63/18* (2013.01);
(Continued)

(58) Field of Classification Search
CPC ..... H04W 60/04; H04W 12/06; H04W 4/005; H04W 8/04; H04W 12/04; H04W 12/08;
(Continued)

(56) References Cited

U.S. PATENT DOCUMENTS

| 8,103,871 B2 | 1/2012 | Deligne et al. |
| 9,628,485 B2 | 4/2017 | Chakraborty et al. |

(Continued)

FOREIGN PATENT DOCUMENTS

| EP | 2741459 A1 | 6/2014 |
| JP | 2008252787 A | 10/2008 |
| WO | WO-2014094835 A1 | 6/2014 |

OTHER PUBLICATIONS

Anonymous, "Network Switching Subsystem," Wikipedia, the free encyclopedia, Jun. 24, 2014, XP055216255, 8 pgs., retrieved from the Internet: URL: https://en.wikipedia.org/w/index.php?title=Network_switching_subsystem&oldid=614168688 [retrieved on Sep. 25, 2015].

(Continued)

*Primary Examiner* — Charles Shedrick
(74) *Attorney, Agent, or Firm* — Holland & Hart LLP

(57) ABSTRACT

Methods, systems, and devices for wireless communication at a network entity are described. A user equipment (UE) may obtain identification information for a device and may assist in establishing credentials by which the device accesses a wireless network, e.g., a cellular network. The UE may establish a connection with the wireless network using its own credentials. A device subscription administration server, which may be an entity within the wireless network core, may authenticate the device based on the identification information, which may include registering the device to access the wireless network, e.g., using different credentials than those of the UE, by associating the device identification information with the credentials of the UE. Once registered, the device may communicate with the wireless network. The device subscription administration server may then establish access parameters and communicate them to the UE, which may transmit them to the device over communication link.

55 Claims, 17 Drawing Sheets

(51) Int. Cl.
| | |
|---|---|
| *H04W 12/06* | (2009.01) |
| *H04W 8/04* | (2009.01) |
| *H04W 48/02* | (2009.01) |
| *H04W 60/00* | (2009.01) |
| *H04W 12/08* | (2009.01) |
| *H04W 8/18* | (2009.01) |
| *H04L 29/06* | (2006.01) |
| *H04W 8/20* | (2009.01) |

(52) U.S. Cl.
CPC ............... *H04W 4/70* (2018.02); *H04W 8/04* (2013.01); *H04W 8/18* (2013.01); *H04W 12/06* (2013.01); *H04W 12/08* (2013.01); *H04W 48/02* (2013.01); *H04W 60/00* (2013.01); *H04W 76/14* (2018.02); *H04W 8/205* (2013.01)

(58) Field of Classification Search
CPC .......................... H04W 60/00; H04W 76/023; H04L 63/0853; H04L 63/18
USPC ........................................................ 455/435.1
See application file for complete search history.

(56) References Cited

U.S. PATENT DOCUMENTS

| | | |
|---|---|---|
| 2003/0120920 A1 | 6/2003 | Svensson |
| 2010/0269156 A1 | 10/2010 | Hohlfeld et al. |
| 2012/0266217 A1 | 10/2012 | Kaal et al. |
| 2013/0099892 A1 | 4/2013 | Tucker et al. |
| 2013/0109355 A1 | 5/2013 | Cope et al. |
| 2013/0115915 A1 | 5/2013 | Tipton et al. |
| 2013/0227656 A1 | 8/2013 | Holtmanns et al. |
| 2013/0247161 A1 | 9/2013 | Bajko |
| 2014/0066013 A1 | 3/2014 | Mascarenhas et al. |
| 2014/0171027 A1 | 6/2014 | Arkko et al. |
| 2015/0128230 A1* | 5/2015 | Chang .................. H04W 12/04 726/5 |
| 2015/0229639 A1 | 8/2015 | Abdulrahiman et al. |
| 2015/0280994 A1 | 10/2015 | Kim et al. |
| 2016/0014601 A1 | 1/2016 | Mellqvist et al. |
| 2016/0021635 A1 | 1/2016 | Lee et al. |
| 2016/0261757 A1 | 9/2016 | Rajadurai et al. |
| 2017/0054564 A1 | 2/2017 | Bone et al. |

OTHER PUBLICATIONS

ISA/EPO, International Search Report and Written Opinion of the International Searching Authority, Int'l. App. No. PCT/US2015/039194, Oct. 8, 2015, European Patent Office, Rijswijk, NL, 12 pgs.

IPEA/EP, Second Written Opinion of the International Preliminary Examining Authority, Int'l. App. No. PCT/US2015/039194, Jul. 1, 2016, European Patent Office, Munich, DE, 5 pgs.

* cited by examiner

ASSOCIATING A DEVICE WITH ANOTHER DEVICE'S NETWORK SUBSCRIPTION

CROSS REFERENCES

The present application for patent claims priority to U.S. Provisional Patent Application No. 62/025,777 by Lee et al., entitled "Associating A Device With Another Device's Network Subscription," filed Jul. 17, 2014, and to U.S. Provisional Patent Application No. 62/025,398 by Lee et al., entitled "UE-Based Network Subscription Management," filed Jul. 16, 2014," which are each assigned to the assignee hereof, and expressly incorporated by reference herein.

BACKGROUND

The following relates generally to wireless communication, and more specifically to associating a device with a UE network subscription. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Some types of wireless devices may provide for automated communication. Some wireless devices may implement Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application. In some cases, an MTC device or a UE may lack credentials for accessing a wireless network. For example, an MTC device may not have a smart card or Universal Integrated Circuit Card (UICC).

SUMMARY

The described features generally relate to one or more improved systems, methods, and/or apparatuses for associating a device with a UE network subscription. A user equipment (UE) may obtain identification information for a device and may assist in establishing credentials by which the device accesses a wireless network. For example, the device may lack a smart card or Universal Integrated Circuit Card (UICC) that stores credentials for accessing a cellular network. To help the device gain access, the UE may establish a connection with a wireless network using its own credentials. A device subscription administration server may authenticate the device based on the identification information. For example, the device subscription administration server may send a message to a device authentication server. The device subscription administration server may then register the device by associating the device identification information with the credentials of the UE. The device subscription administration server may then establish access parameters and communicate the access parameters to the UE, which may transmit them to the device over a local connection.

A method of wireless communication performed by a network server is described. The method may include establishing a connection with a UE based on a network credential of the UE, obtaining identification information from the UE for a device that lacks credentials for accessing a wireless network, and registering the device for access to the wireless network with a network credential for the device that is different from the network credential of the UE. The registration may include associating the identification information for the device with the network credential of the UE.

An apparatus for wireless communication is described. The apparatus may be a network server or a component of a network server, as described herein. The apparatus may include means for establishing a connection with a UE based on a network credential of the UE, means for obtaining identification information from the UE for a device that lacks credentials for accessing a wireless network, and means for registering the device to access the wireless network with a network credential for the device that is different from the network credential of the UE, where the registration may include associating the identification information for the device with the network credential of the UE.

A further apparatus for wireless communication is described. The apparatus may be a network server or a component of a network server, as described herein. The apparatus may include at least one processor, memory in electronic communication with the at least one processor, and instructions stored in the memory. The instructions may be operable, when executed by the at least one processor, to cause the apparatus to establish a connection with a UE based on a network credential of the UE, obtain identification information from the UE for a device that lacks credentials for accessing a wireless network, and register the device to access the wireless network with a network credential for the device that is different from the network credential of the UE, where the registration may include associating the identification information for the device with the network credential of the UE.

A non-transitory computer-readable medium storing code for wireless communication is also described. The code may include instructions executable to establish a connection with a UE based on a network credential of the UE, obtain identification information from the UE for a device that lacks credentials for accessing a wireless network, and register the device to access the wireless network with a network credential for the device that is different from the network credential of the UE, where the registration may include associating the identification information for the device with the network credential of the UE.

Some examples of the methods apparatuses, and/or non-transitory computer-readable media described herein may include processes, features, means, or instructions for obtaining the network credential of the device from a device manufacturer. The network credential of the device may be a shared key or a private-public key pair provisioned by the device manufacturer. Some examples may additionally or alternatively include processes, features, means, or instructions for sending a message to a device authentication server, receiving a response from the device authentication server, and authenticating the identification information for the device based on the response from the device authentication server.

In some examples of the methods, apparatuses, and/or non-transitory computer-readable media described herein, the identification information for the device is of a different kind than the network credential of the UE.

In some examples of the method, apparatuses, and/or non-transitory computer-readable media described above, the network credential of the UE is provisioned by an operator of the wireless network and the network credential of the device is provisioned by a manufacturer of the device.

Some examples of the methods, apparatuses, and/or non-transitory computer-readable media described herein may include processes, features, means, or instructions for sending wireless access parameters for the device over the connection to the UE. The wireless access parameters include at least one of: a network credential for the device, a subscription identity associated with the network credential of the UE, a network identifier, a public key of the network, or a public key certificate of the network, or any combination thereof.

In some examples of the methods, apparatuses, and/or non-transitory computer-readable media described herein, the subscription identity may include at least one of: a globally unique temporary identity (GUTI) and/or an international mobile subscriber identity (IMSI) of the UE and the network identifier may include a public key certificate of the network, a public key of the network, or a public land mobile network (PLMN) identity, or any combination thereof. Some examples may additionally or alternatively include processes, features, means, or instructions for authenticating the identification information for the device.

Some examples of the methods, apparatuses, and/or non-transitory computer-readable media described herein may include processes, features, means, or instructions for sending a device registration confirmation message to the UE upon registering the device to access the wireless network.

In some examples of the methods, apparatuses, and/or non-transitory computer-readable media described herein, registering the device may include sending registration information to a home subscriber server (HSS) of the UE to be added to a device subscription list stored at the HSS, where the registration information may include the identification information and the network credential for the device. In some examples, the identification information for the device may include at least one of: a device identifier, device parameters, a uniform resource locator (URL), a shared key, a public key, or a public key certificate of the device, or any combination thereof.

In some examples of the methods, apparatuses, and/or non-transitory computer-readable media described herein, registering the device to access the wireless network may include providing a network entity with access restrictions for the device. In some examples, the access restrictions may include at least one of: access time duration limits, time of use specifications, maximum bandwidth limits, service parameters, uplink throughput limits, or downlink throughput limits, or any combination thereof.

Some examples of the methods, apparatuses, and/or non-transitory computer-readable media described herein may include processes, features, means, or instructions for receiving an authentication request for the device from the UE via a connection with the UE, and sending an authentication acknowledgement for the device to the UE via the connection.

A further method for wireless communication performed by a UE is described. The method may include obtaining identification information for a device that lacks credentials for accessing a wireless network, establishing a connection with a wireless network based on a network credential of the UE, sending the identification information for the device to a network server over the connection to associate the identification information for the device with the network credential of the UE, and receiving wireless access parameters for the device over the connection.

A further apparatus for wireless communication is described. The apparatus may be a UE or a component of a UE, as described herein. The apparatus may include means for obtaining identification information for a device that lacks credentials for accessing a wireless network, means for establishing a connection with a wireless network based on a network credential of the apparatus, means for sending the identification information for the device to a network server over the connection to associate the identification information for the device with the network credential of the apparatus, and means for receiving wireless access parameters for the device over the connection.

A further apparatus for wireless communication is described. The apparatus may be a UE or a component of a UE, as described herein. The apparatus may include at least one processor, memory in electronic communication with the at least one processor, and instructions stored in the memory. The instructions may be operable, when executed by the at least one processor, to cause the apparatus to obtain identification information for a device that lacks credentials for accessing a wireless network, establish a connection with a wireless network based on a network credential of the apparatus, send the identification information for the device to a network server over the connection to associate the identification information for the device with the network credential of the apparatus, and receive wireless access parameters for the device over the connection.

A further non-transitory computer-readable medium storing code for wireless communication is also described. The code may include instructions executable to obtain identification information for a device that lacks credentials for accessing a wireless network, establish a connection with a wireless network based on a network credential of a UE, send the identification information for the device to a network server over the connection to associate the identification information for the device with the network credential of the UE, and receive wireless access parameters for the device over the connection.

Some examples of the methods, apparatuses, and/or computer-readable media described herein include processes, features, means, or instructions for establishing a local communication link with the device, over which the identification information for the device is obtained. Some examples of methods, apparatuses, and/or computer-readable media described herein may additionally or alternatively include a processes, features, means, or instructions for sending the wireless access parameters to the device over the local communication link, where the wireless access parameters may include at least one of: a network credential for the device, a subscription identity associated with the network credential of the apparatus, a network identifier, a public key of the network, or a public key certificate of the network, or any combination thereof.

Some examples of the methods, apparatuses, and/or computer-readable media described herein include processes, features, means, or instructions for sending an authentication request for the device to the network server via a connection with a wireless network and receiving an authentication acknowledgement for the device from the network server via the connection.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A user equipment (UE) may obtain identification information for a device that lacks credentials for accessing a wireless network. For example, the device may lack a smart card or universal integrated circuit card (UICC) that stores credentials for accessing a cellular network. To help the device gain access, the UE may establish a connection with a wireless network using its own credentials. A device subscription administration server may authenticate the device based on the identification information for the device. For example, the device subscription administration server may send a message to a device authentication server. The device subscription administration server may then register the device to access the wireless network with a network credential by associating the device identification information with the credentials of the UE. The device subscription administration server may obtain credentials of the device through a secure channel to a device manufacturer server, independent of the UE. The device subscription administration server may then establish access parameters, which may include the network credential of the device by which the device may obtain service on a wireless network. These parameters may be communicated to the UE, which may transmit them to the device over a local connection. By establishing credentials of the device separate from those of the UE, the device subscription administration server may enable the device to access the wireless network.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
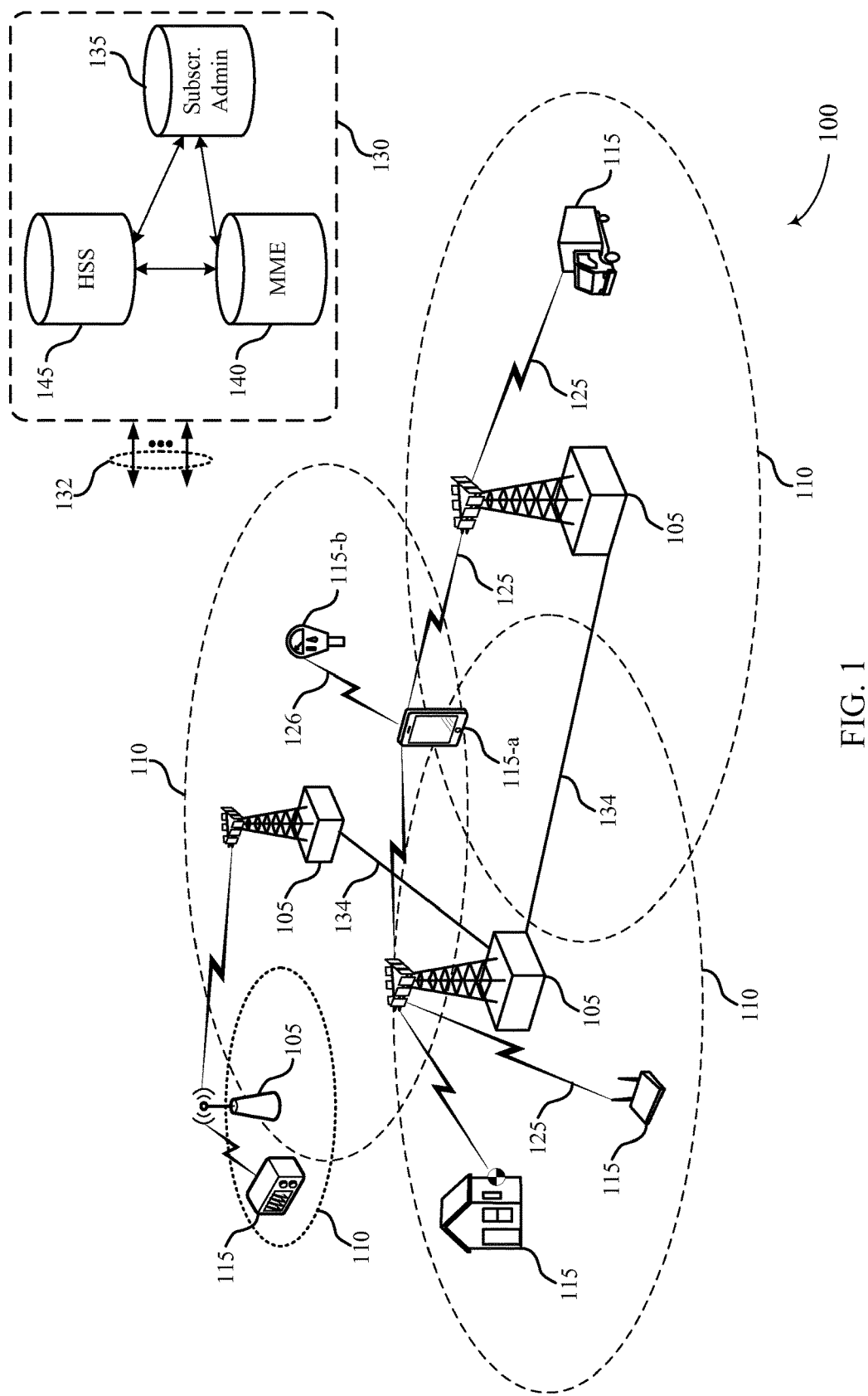
FIG. 1 illustrates an example of a wireless communications system that supports associating a device with another device's network subscription in accordance with the present disclosure.

FIG. 1 illustrates an example of a wireless communications system 100 that supports associating a device with a UE network subscription in accordance with the present disclosure. The system 100 includes base stations 105, communication devices, also known as user equipment (UE) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. The core network may verify the access credentials of a UE 115, which may be associated with a subscription identity of the user. The operator of the system 100 may offer subscription-based service such that owners and/or users of UEs 115 (e.g., customers of the operator) may pay a fee for data sent and received via the system 100 utilizing their respective UEs 115. Thus, the operator of the system 100 may require each UE 115 to be associated with a subscription before the UE 115 is authorized to send or receive data via the system 100. The subscription may facilitate tracking of data sent and received via the system 100 so that the operator of the system 100 is able to charge users based on system use. In some cases, this arrangement may be referred to as reverse billing an associated subscription.

In some examples, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. A UE may also communicate with other UEs or devices via a local connection 126. For example, a UE may communicate with a device via a local wireless connection (e.g., a wireless local area network (WLAN) or Bluetooth) or via a wired connection.

The base stations 105 may wirelessly communicate with the UEs 115 via one or more base station antennas. Each of the base station 105 sites may provide communication coverage for a respective geographic area 110. In some examples, base stations 105 may be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The coverage area 110 for a base station may be divided into sectors making up only a portion of the coverage area (not shown. The system 100 may include base stations 105 of different types (e.g., macro, micro, and/or pico base stations). There may be overlapping coverage areas for different technologies.

The system 100 may be a Heterogeneous Long Term Evolution (LTE)/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). Core network 130 may include a device subscription administration server 135 for managing UE 115 and device group subscription actions, a mobility management entity (MME) 140 for coordinating control mobility and control data, and a home subscriber service (HSS) 145 for updating a database of user subscription information. The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, despite being equipped to operate in the system 100, MTC devices may be configured without a smart card, UICC, or other subscriber identity module (SIM)-based credentials. For instance, an MTC device, such as a remote monitoring device, may lack a SIM circuit (e.g., a UICC). Or, an MTC device may be configured without a virtual SIM within its processor.

The communication links 125 shown in system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

According to the present disclosure, a UE 115-*a* may obtain identification information for a device 115-*b* that lacks credentials for accessing a wireless network. The UE 115 may establish a connection with the network based on a credential and a network entity (e.g., the device subscription administration server 135) may aid the network entity in registering the device 115-*b* for service. For example, a UE 115 may associate identification information for the device with the subscription identity of the UE 115.

Figure 2:
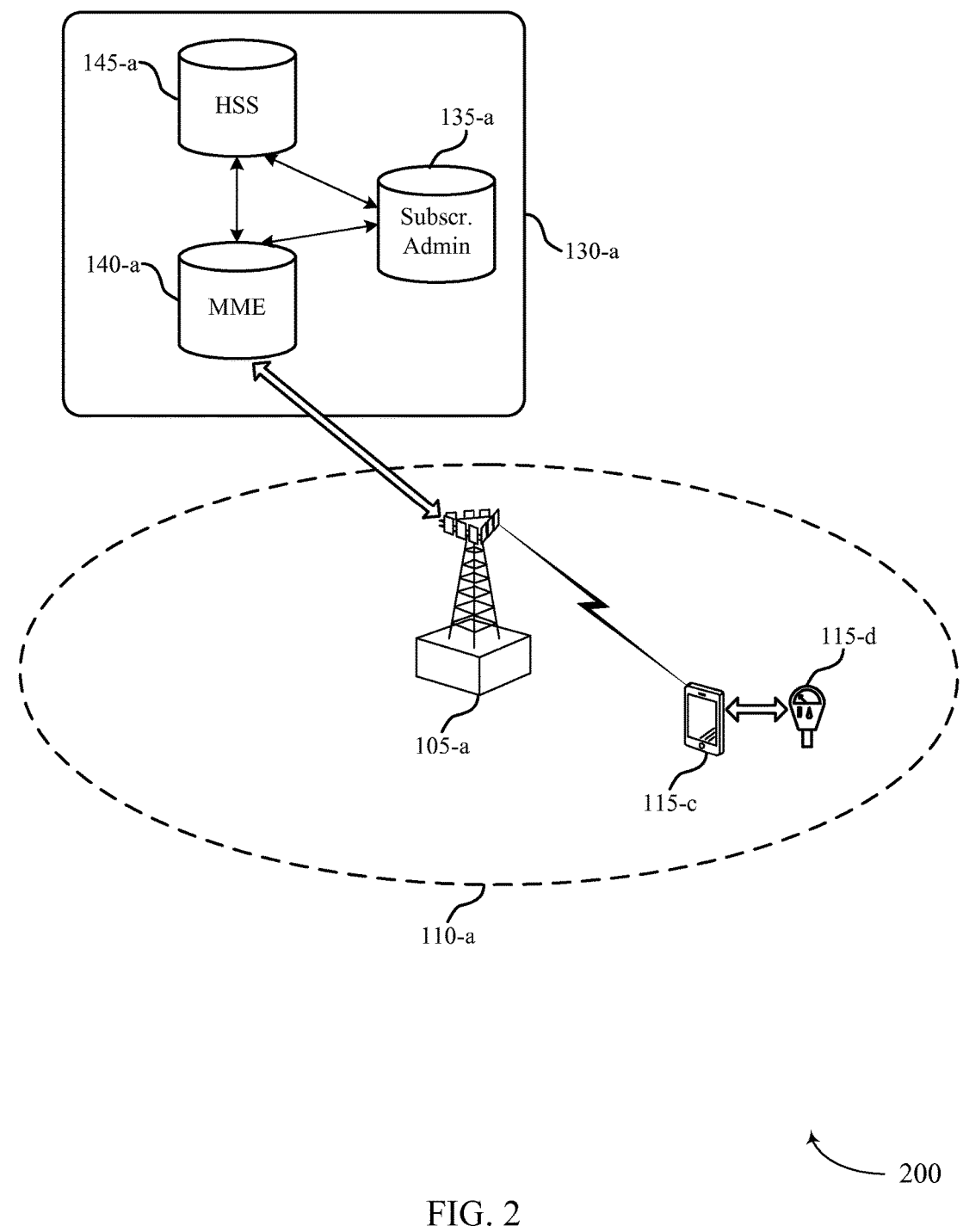
FIG. 2 illustrates additional aspects of a wireless communication system that supports associating a device with another device's network subscription in accordance with the present disclosure.

FIG. 2 illustrates an example of a wireless communications system 200 that supports associating a device with another device's network subscription, in accordance with various aspects of the present disclosure. As shown, wireless communications system 200 may include UE 115-*c* that has credentials for accessing a wireless network and device 115-*d* (e.g., an MTC device) that lacks credentials for accessing a wireless network. UE 115-*c* and device 115-*d* may be examples of UEs and devices 115 described with reference to FIG. 1. System 200 is also shown as including a base station 105-*a* with coverage area 110-*a* that may facilitate communication between a core network 130-*a* and UE 115-*c*. According to aspects of the present disclosure, device 115-*d* communicates with core network 130-*a* after UE 115-*c* has registered device 115-*d* with the network. Core network 130-*a* may include a device subscription administration server 135-*a*, an MME 140-*a* and an HSS 145-*a*. In some cases, each of these network entities may be directly connected. In other cases, they may be indirectly connected. For example, the device subscription administration server 135-*a* and MME 140-*a* may not have a direct connection. Base station 105-*a* and core network 130-*a* may be examples of the corresponding components of wireless communications system 100 described with reference to FIG. 1.

Device 115-*d* may be one of several similar devices configured to operate within the wireless communications systems 100 and 200. For example, device 115-*d* may be one of several hundreds (or several thousands) of parking meters operated by a municipality. The municipality may seek to wirelessly monitor and control aspects of parking meter operation within the city. Accordingly, each parking meter may be configured for wireless communications (e.g., MTC communication described above), and the communications systems and circuitry of each parking meter (e.g., device 115-*d*) may be as simple as possible. For instance, the device 115-*d* may be equipped with the minimum processing and radio frequency (RF) componentry necessary to facilitate the intermittent communication required by the municipality. Such devices may be described herein as low-cost and/or limited complexity devices. This may allow the municipality to maintain relatively low-cost, low-maintenance, reliably connected devices. The device 115-*d* may thus be configured without necessary hardware or processing capability to independently establish a subscription to the network 130-*a*.

Under a subscriber-based network access model, as discussed above, a UE 115 may be required to have credentials (e.g., network credentials) to access a network. Often, this may require each device to be provisioned by the network operator. Even when over-the-air (OTA) provisioning is available, such as embedded SIM (eSIM or virtual SIM), the componentry required to implement such procedures may create cost-prohibitive barriers to enabling such low-cost or low-complexity devices to operate on cellular networks. Thus, the existing subscription-based service model may be in tension with, and an impediment to, the widespread implementation of low-cost MTC or other reduced complexity devices.

Moreover, the municipality and/or operator of the wireless communications systems 100 and 200 (e.g., cellular service provider) may prefer to associate numerous (or all) parking meters within the city limits with a single subscription maintained by the municipality. For example, the municipality may wish to simplify accounting and payment for wireless data usage associated with a parking program. It may therefore be desirable to associate parking meters to a single subscription; and the municipality may wish to frequently change the number and identity of devices associated with the subscription. For instance, the municipality may add several new parking meters, or it may decommission several meters, as areas within a parking enforcement zone expand or contract. In order to readily facilitate the addition of new devices to the municipality's subscription, it may be beneficial to allow devices to be associated with the subscription by an employee of the municipality, and without direct involvement from the operator of the wireless communications systems 100 and 200 (e.g., cellular service provider). For example, an employee may utilize a municipality-issued smartphone (e.g., UE 115-*c*) to associate parking meters (e.g., device 115-*d*) as needed.

Those skilled in the art will recognize that aspects of the present disclosure may be beneficial in other scenarios as well. For example, electric, gas, and/or water utilities may frequently add and remove metering equipment within their service territory. Accordingly, device 115-*d* may be a utility meter that may be associated with a utility company's subscription to a wireless network by utilizing UE 115-*c*. That is, a utility employee may associate various meters with a common subscription while servicing utility-owned equipment. In other examples, wildlife monitoring devices (e.g., cameras) may be placed in remote locations; thus, device 115-*d* may be a wildlife monitoring device that may be associated with an organization's subscription utilizing UE 115-*c*. For instance, UE 115-*c* may be a smartphone owned by, and having a subscription registered to the organization, and a volunteer may utilize UE 115-*c* to associate device 115-*d* with the organization's subscription.

As another example, a user may purchase a new device 115-*d* with capabilities for cellular network service and may wish to add the device 115-*d* to their cellular subscription. To obtain service, the user may register the device 115-*d* with the network operator under their existing subscription agreement, e.g., under an agreement in which the consumer pays for data sent to/from the device over the wireless network, e.g., reverse billing to an associated subscription. The registration may be enabled in a variety of ways, e.g., the registration may be automated by the user scanning a Quick Response (QR) code on the device 115-*d* or the device packaging. Alternatively, the user may manually enter the information. This may result in simplified subscription management and billing for the user to enable multiple devices 115. In some cases, a device 115-*d* may be added without any coordination with the operator except to register the device to a subscription.

The device subscription administration server 135-*a* may host the functions for provisioning a device subscription list associated with a subscription by providing a user interface to the subscriber. One example of the device subscription user interface may be a hypertext transfer protocol (HTTP)-based interface, which may include a device subscription menu tab within a web page that the subscriber may use to control other aspects of their account, such as billing. The device subscription administration server may update the device subscription list associated with a subscription stored in the network by the HSS 145-*a* when a device is added or removed.

MME 140-*a* is, in some cases, a key network node for exchanging control information with UEs 115. For example, MME 140-*a* may be involved in the network connection activation/deactivation process and may also be involved in authenticating a UE 115 with HSS 145-*a*. Non Access Stratum (NAS) signaling—which may be used for the authorization and establishment of communication sessions and for maintaining continuous communications with UEs 115 as they move—may be initiated and/or directed to MME 140-*a*. MME 140-*a* may also allocate a temporary identity to UE 115. For example, MME 140-*a* may allocate a globally unique temporary identity (GUTI) to a UE 115 that includes identification information for MME 140-*a* as well as a temporary identity for a UE 115. A GUTI may minimize the frequency with which a persistent identity, e.g., an international mobile subscriber identity (IMSI), is transmitted within the network. MME 140-*a* may also check whether a UE 115 is authorized to camp on a service provider's Public Land Mobile Network (PLMN), and may manage security keys for NAS signaling such as attachment procedures for UEs 115 and handles the security key management.

HSS 145-*a* is a central database for user and subscription related information. The functions of HSS 145-*a* may include mobility management, call and session establishment support, user authentication and access authorization. HSS 145-*a* may be co-located or in communication with an Authentication Center (AuC) (not shown). HSS 145-*a*, or another network entity may store a device subscription list, which may be a list of devices 115 and/or groups of devices 115 stored in the network. Each device entry may contain the device identities (IDs) and other information associated with the subscriber. For example, the list may include a name for each device 115, which may be an identifier for a device 115 and which may indicate a device type (e.g. device@thermostat). It may also include a device ID, e.g., a globally unique link-layer identifier identifying the device 115 such as an international mobile station equipment identifier (IMEI), an extended unique identifier (EUI), or a media access control (MAC) address. The list may also include one or more device group IDs, e.g., a globally unique link-layer identity that identifies a group of devices to associate with a subscription. In some cases, a device identifier may also be a Mobile Subscriber Integrated Services Digital Network-Number (MSISDN), or a network access identifier (NAI).

According to aspects of the present disclosure, UE 115-*c* may establish a connection with a wireless network in part by exchanging its credentials and identity verification information with MME 140-*a* and HSS 145-*a* in core network 130-*a*. UE 115-*c* may obtain identification information from device 115-*d* and register device 115-*d* with core network 130-*a*. The components of core network 130-*a* may then associate the identification information of the device 115-*d* with the subscription information of UE 115-*c*, so that device 115-*d* may subsequently access the network, even if device 115-*d* lacks sufficient credentials or capabilities to access the network without initially being associated with the subscription identity of UE 115-*c* (e.g., even if device 115-*d* lacks SIM capabilities). In some examples, device 115-*d* may, after being registered, access the wireless network with limited assistance of UE 115-*c*. In other cases, device 115-*d* may, after being registered, access the wireless network without assistance from UE 115-*c*. In some examples, after registration, device 115-*d* may access the wireless network independently.

Figure 3:
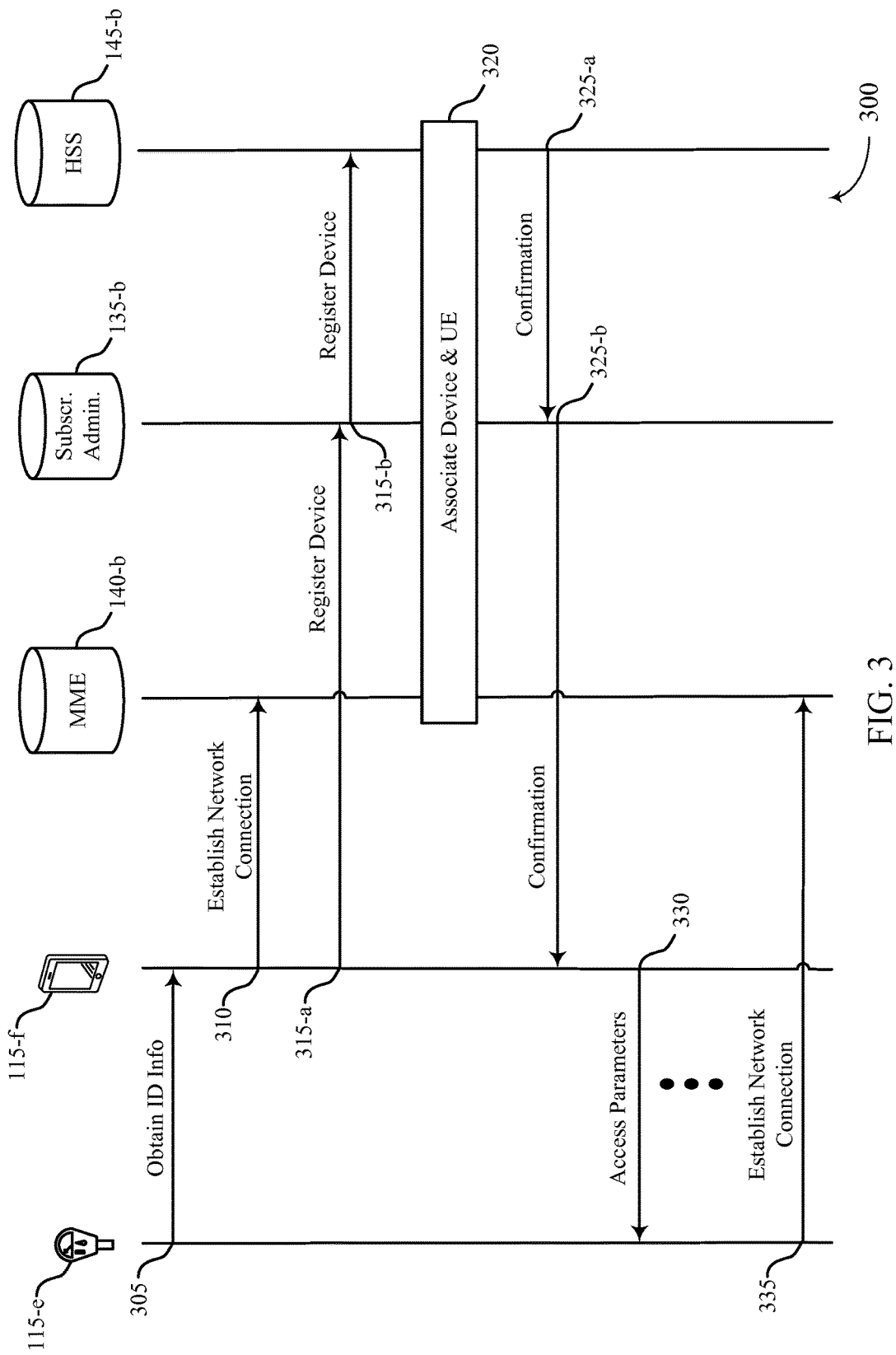
FIG. 3 illustrates an exemplary call flow in which a device is associated with another device's network subscription in accordance with the present disclosure.

FIG. 3 illustrates an exemplary call flow 300 in which a device 115-*e* is associated with another device's subscription, in accordance with various aspects of the present disclosure. Call flow 300 may include operations performed by a device 115-*e* that lacks credentials for network access, and UE 115-*f* that has network access credentials. For example, UE 115-*f* may be associated with a subscription, while device 115-*e* may not; and device 115-*e* may be configured such that it is unable to undergo a credentialing or provisioning procedure (e.g., OTA provisioning) without participation by the UE 115-*f*. Device 115-*e* and UE 115-*f* may be examples of UEs and devices 115 described with reference to FIGS. 1-2. Call flow 300 may also include operations performed by a device subscription administration server 135-*b*, an MME 140-*b* and an HSS 145-*b*, which may be examples of the corresponding components of system 200 described with reference to FIG. 2.

Prior to initiating the operations depicted by call flow 300, UE 115-*f* may establish a local communication link with the device 115-*e* to obtain identification information for device 115-*e*. For example, UE 115-*f* may obtain the identification information utilizing a wireless personal area network (WPAN) connection (e.g., a Bluetooth or Zigbee connection), utilizing a universal serial bus (USB) link, utilizing a near field communication (NFC) link, or a WLAN link.

In some examples, obtaining the identification information for device 115-*e* is performed using a local communication link as described above, and in other cases the identification information may be obtained without a local communication link. For example, information may be obtained by scanning a QR code, accessing a uniform resource locator (URL), or by entering information printed on device 115-*e* or the associated documentation, as mentioned above. Identification information may include a serial number of the device 115-*e*, an international mobile station equipment identity (IMEI), a unique device identifier (UDID), information related to the capabilities of device 115-*e*, information related to the device manufacturer, or other identification information.

The UE 115-*f* may establish a connection 310 with a wireless network based on its network credentials. For example, UE 115-*f* may send an attach request via a base station 105 to MME 140-*b*. In some cases, UE 115-*f* may send a temporary identity (e.g., a GUTI) with the attach request. If the GUTI was issued by MME 140-*b*, it may have information about UE 115-*f* stored in memory. In other cases, MME 140-*b* may communicate with another MME 140-*a* identified by the GUTI to obtain identification and security information for UE 115-*f*. If MME 140-*b* does not have the information stored and is unable to retrieve it from another MME 140-*a*, the MME 140-*b* may request that UE 115-*f* provide the IMSI so that a new GUTI may be generated. UE 115-*f* may also exchange security keys and/or certificates with MME 140-*b* and/or HSS 145-*b* (via MME 140-*b*) to verify its identity. One or more security keys may be provisioned by the operator of the network to the UE 115-*f*, and stored in a SIM card, smart card, or UICC in the UE 115-*f*. MME 140-*b* may then proceed to create a network session for UE 115-*f* by communicating with a serving gateway (SGW) (not shown), which may facilitate exchange of user plane data for UE 115-*f*. In some cases, network connection 310 is established prior to UE 115-*f* obtaining identification information from device 115-*e*.

The UE 115-*f* may aid a device subscription administration server 135—in registering the device 115-*e* and add the device to its device subscription list by sending a registration message that includes device information to the device subscription administration server 135-*b*. The device information may include identification information (e.g., device ID), a public key, and other parameters such as an expiration time and QCI bound to the device ID. The registration message may also include identifiers that uniquely identify the UE subscription at HSS (e.g., IMSI/GUTI/GUMMEI or another identifier such as an NAI associated with the subscription). This registration message may be integrity and confidentiality-protected using a shared secret key that is known to the UE and the network (e.g., using keys derived from a UICC). Adding the device to the UE's subscription list may be subject to approval by a network. For example, the device subscription administration server 135-*b* may determine whether to approve the addition/removal based on billing models or roaming agreements, for example. Once approved, the device subscription administration server 135-*b* may then register the device with HSS 145-*b* or another network entity to update the subscription list stored in the HSS; the registration 315-*b* may include associating the identification information for the device with the network credential of the UE 115-*f*. The UE 115-*f* may also remove the device 115-e from its subscription by sending a deregistration message to the device subscription administration server 135-b. Removal may also be subject to approval by the network.

In some examples, the registration enables the device to access a wireless network with a network credential that is different from the network credential of the UE. For example, the device subscription server 135-b may obtain a network credential of the device from a device manufacturer, independent of the UE, using a device ID included in the registration message. That is, the UE may not share its network credential with the device to be added to its subscription list, and provisioning of the device credentials is performed by a device manufacturer instead of a network operator of the UE. The network credential may include a shared key provisioned to the device by the device manufacturer, or a private-public key pair provisioned to the device by the device manufacturer. Utilizing a different network credential from the UE's may provide for a measure of security that simply sharing the UE's 115-f network credential might not. For instance, if device 115-e accesses the network with its own network credential, and if the security of device 115-e is compromised after it has been associated with the UE's 115-f subscription, the privacy of UE's 115-f network credential may remain intact because device 115-e may not have access to the UE's 115-f credential. Further, the device 115-e can access, with its own credential, an out-of-band network (e.g., non-cellular network) that is different from a UE's serving network (e.g., cellular network) without relying on a UE's credential.

The registration may involve sending a request including the identification information of the device 115-e to HSS 145-b via device subscription administration server 135-b. In some examples, the identification information for the device 115-e may be of a different kind than the network credential of the UE 115-f. For example, the network credential of the UE 115-f may be maintained in a smart card or UICC, whereas device 115-e may lack smart card or UICC capabilities. In some examples, the network credential of the UE 115-f may be provisioned by an operator of the wireless network and identification information may be established by a manufacturer of the device. Using the identification information of the device, the device subscription administration server 135-b may obtain a credential of the device (e.g., secret key) and/or a public key of the device through a secure channel to a device manufacturer server. In some cases, the network credential of the UE 115-f may represent a higher level of security or trust than the identification information for the device 115-e. For example, the identification information for the device 115-e may not include security keys provided by the network operator. In some examples, the identification information for the device may include a device identifier, device parameters, a URL, a shared key, a public key, or a certificate of the device.

A device subscription application on UE 115-f may communicate with device subscription administration server 135-b to update the subscriber's device subscription list stored in the HSS 145-b. The device subscription administration server 135-b may access a specific HSS 145 associated with the subscriber in order to update the device subscription list. If a public key of device 115-e is signed by the manufacturer, for example, the device subscription administration server 135-b may also obtain the manufacture's public key through a secure channel to the device manufacturer. In another example, UE 115-e may use a manufacturer's certificate signed by a trusted third party such as Verisign. In this case, the manufacturer's public key may not be transferred through a secure channel. The device subscription administration server 135-b may then send a subscription update message that includes the identification information 305 for device 115-e to HSS 145-b along with the subscriber's identity.

Device subscription administration server 135-b may then cause HSS 145-b, MME 140-b, or other network entities to update the subscription information of UE 115-f to include an association 320 between the user information for UE 115-f and device 115-e. For example, an association may be created between a UDID of device 115-e and an IMSI of UE 115-f. In some cases, association 320 may be created based on authentication of the UE 115-f. For example, association 320 of UE 115-f and device 115-e may be permissible based on the registration request being performed by an authenticated UE 115-f communicating over a trusted connection. A registration request transmitted via an external network, e.g., via the internet, may be rejected. Adding or removing device 115-e may be subject to approval by the operator. For example, a network operator may determine whether to approve the device 115-e based on a subscription type, billing models, roaming agreements etc.

In some cases, e.g., if the device identification information 305 includes a secret key, HSS 145-b may compute a device specific session key using a well-known key derivation function (e.g., a hash message authentication code (HMAC) or secure hash algorithm (SHA)) and may include it in the updated device subscription list. Then, HSS 145-b may send the updated device subscription list, along with the device keys, session keys, and a nonce (e.g., an arbitrary number) to MME 140-b. The nonce may be provided to the device during the serving network authentication of the device so that the device can derive the same device session keys. If the device identification information 305 includes a public key, HSS 145-b may send the updated device subscription list and the public key to MME 140-b.

If the association 320 is successful, HSS 145-b (or, in some cases, MME 140-b or another network entity) may send a confirmation message 325 to device subscription administration server 135-b, which may then confirm the update with UE 115-f. The confirmation message 325 may include wireless access parameters for the device 115-e. At this point, UE 115-f may send the wireless access parameters 330 for the network to the device 115-e over the local communication link, where the access parameters 330 facilitate access to the wireless network by the device. In some examples, the access parameters 330 include at least one of: a network credential, a subscription identity associated with the network credential of the UE, a network identifier, a public key of the network, or a public key certificate of the network, or any combination thereof. In some examples, UE 115-f establishes access restrictions for device 115-e by communicating with one or more network entities (e.g., MME 140-b or HSS 145-b). For example, UE 115-f may restrict the frequency, duration, or location that device 115-e may be allowed to access the network. In some examples, the access restrictions include access time duration limits, quality-of-service (QoS) parameters, traffic type restrictions, time of use specifications, an expiry time, maximum bandwidth limits, service parameters, uplink throughput limits, or downlink throughput limits. Thus, the access parameters 330 may include information to facilitate device 115-e connecting to the network and may also indicate access restrictions.

In some examples, device subscription administration server 135-b may authenticate the identification information for the device 115-e. This may enable device subscription administration server 135-b to determine that device 115-e is allowed to be registered with the network. The identification information may include a shared key of the device, or a public key of the device. For instance, device subscription administration server 135-*b* may send an authentication request to a device authentication server (e.g., a server operated by the device manufacturer). This authentication request may be transmitted over the network connection (or another communications link) and through the internet. Device subscription administration server 135-*b* may wait to receive an authentication response from the device authentication server prior to registering the device 115-*e*. If device 115-*e* cannot be authenticated, device subscription administration server 135-*b* may abort the registration. In some cases, UE 115-*f* may include, and run, a device subscription application that UE 115-*f*, and a user of UE 115-*f*, may utilize for managing devices associated with UE's 115-*f* subscription. Device subscription administration server 135-*b* may authenticate device 115-*e* before allowing it to be added to the device subscription application.

When device 115-*e* has received the access parameters 330, it may then establish a network connection 335 based on the association 320 of the device identification information and the subscription identity of the UE 115-*f*. For example, device 115-*e* may send an attach request to MME 140-*b*. However, the attach procedure for device 115-*e* may differ from the attach procedure for UE 115-*f*. For example, the network may allow device 115-*e* to establish a connection without performing a security authentication procedure that requires keys stored on a UICC or with a SIM. Also, network connection 335 may be subject to access restrictions established by UE 115-*f*. In some cases, UE 115-*f* may alter the security restrictions. For example, the user may communicate with the network operator, e.g., by accessing an application on UE 115-*f* or by utilizing an web interface of the network operator.

In some cases, the network may implement security procedures based on a device credential, such as the public key or certificate of the device 115-*f*. In one example, if such a public key is available, a device ID may be defined as the hash of the device's public key. In some cases, a device public key may be signed by a trusted third party (e.g., Verisign or IRNA) and may be available in the form of a X.509 certificate.

The subscriber for UE 115-*f* may also remove device 115-*e* from the device subscription list by deselecting the associated device ID from a device subscription application. A deregistration request may be sent to HSS 145-*b* and optionally to MME 140-*b* utilizing the same call path as the registration. If the deregistration is successful, the device subscription administration server 135-*b*, in coordination with 145-*b* and MME 140-*b* may remove device 115-*e* from the subscriber's device subscription list, and the MME 140-*b* deletes security and other contexts associated with device 115-*e*.

Figure 4:
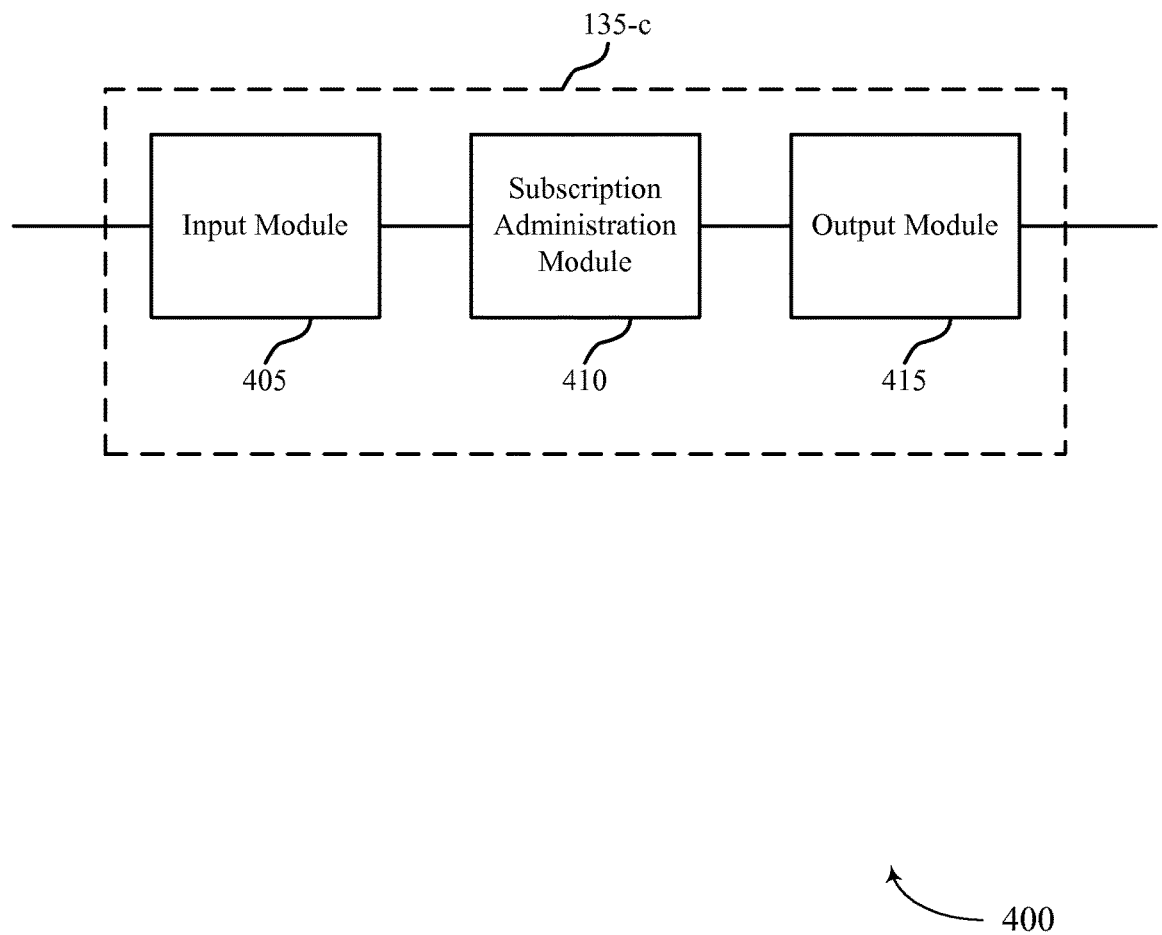
FIG. 4 shows a block diagram of an exemplary device subscription administration server configured according to the present disclosure.

FIG. 4 shows a block diagram 400 of an exemplary device subscription administration server 135-*c* configured for associating a device with a UE network subscription in accordance with various embodiments. The device subscription administration server 135-*c* may be an example of one or more aspects of a device subscription administration server 135 described with reference to FIGS. 1-3. The device subscription administration server 135-*c* may include an input module 405, a subscription administration module 410, and/or an output module 415. The device subscription administration server 135-*c* may also include a processor. Each of these components may be in communication with each other.

The components of the device subscription administration server 135-*c* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The input module 405 may receive information such as packets, user data, and/or control information associated with various information channels (e.g., control channels, data channels, etc.). Information may be passed on to the subscription administration module 410, and to other components of the device subscription administration server 135-*c*.

The subscription administration module 410 may be configured to establish a connection with a UE based on a network credential of the UE. The subscription administration module 410 may be configured to obtain identification information from the UE for a device that lacks credentials for accessing a wireless network. The subscription administration module 410 may be configured to register the device with a network entity; the registration may include associating the identification information for the device with the network credential of the UE at the wireless network.

The output module 415 may pass on data received from other components of the device subscription administration server 135-*c* to other network entities.

Figure 5:
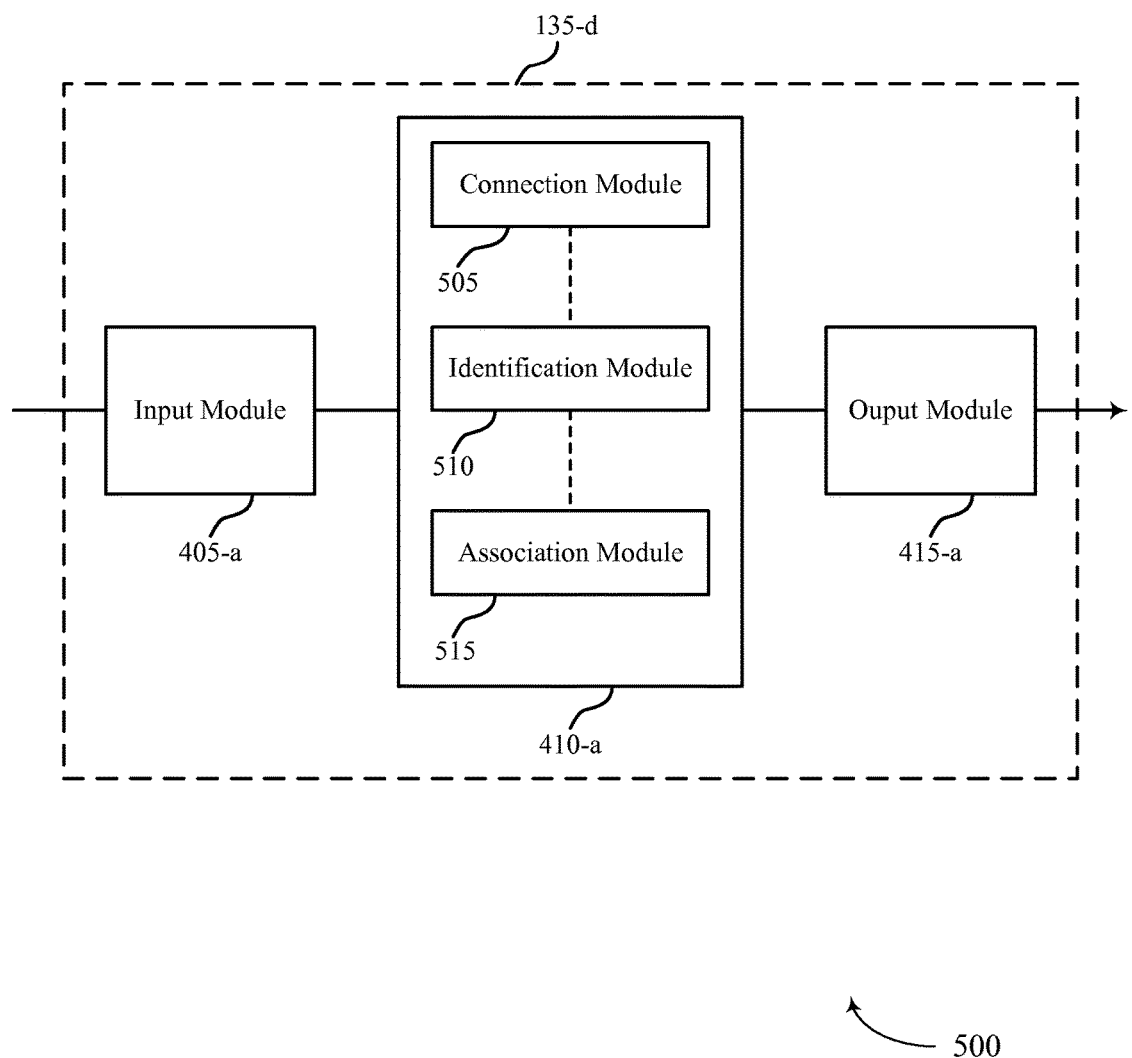
FIG. 5 shows a block diagram of an exemplary device subscription administration server configured according to the present disclosure.

FIG. 5 shows a block diagram 500 of an exemplary device subscription administration server 135-*d* configured for associating a device with a UE network subscription in accordance with various embodiments. The device subscription administration server 135-*d* may be an example of one or more aspects of a device subscription administration server described with reference to FIGS. 1-4. The device subscription administration server 135-*d* may include a input module 405-*a*, a subscription administration module 410-*a*, and/or a output module 415-*a*. The device subscription administration server 135-*d* may also include a processor. Each of these components may be in communication with each other. The subscription administration module 410-*a* may include a connection module 505, an identification module 510, and an association module 515.

The components of the device subscription administration server 135-*d* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The input module 405-*a* may receive information which may be passed on to the subscription administration module 410-*a*, and to other components of the device subscription administration server 135-*d*. The subscription administration module 410-*a* may be configured to perform the operations described above with reference to FIG. 4. The output module 415-*a* may send the one or more signals received from other components of the device subscription administration server 135-*d* to other network entities.

The connection module 505 may be configured to establish a connection with a UE based on a network credential of the UE as described above with reference to FIG. 3. In some examples, the network credential of the UE may be maintained in a UICC of the UE. In some examples, the device lacks SIM capabilities. In some examples, the network credential of the UE may be provisioned by an operator of the wireless network and identification information of the device may be established by a manufacturer of the device.

The identification module 510 may be configured to obtain identification information for a device from the UE over the connection as described above with reference to FIG. 3; the device may lack credentials for accessing a wireless network. In some examples, the identification information for the device may be of a different kind than the network credential of the UE. In some examples, the identification information for the device may include a device identifier, device parameters, a URL, a shared key, a public key, and/or a certificate of the device.

The association module 515 may be configured to register the device to access a wireless network as described above with reference to FIG. 3; and the registration may include associating the identification information for the device with the network credential of the UE. The registration may, for example, enable the device to access the wireless network with a network credential that is different from the network credential of the UE. Although the UE may provide the identification information of the device to the device subscription administration server 135, the UE does not, in some examples, share its own network credential with the device to be added to its subscription list stored in a HSS. As such, the procedures related to the registration of the device (e.g., verifying a subscription profile of the device to determine whether the device is allowed to be added to the subscription of the UE and/or obtaining a credential of the device) may be performed between the device subscription administration server 135 and other network entity. Additionally or alternatively, although the identification information of the device may be transferred from the UE to the device subscription administration server 135, communications of the device subscription administration server with the UE may not reveal secret information (e.g., secret key or private key) of the device. In some examples, registering the device may include sending registration information to the HSS of the UE to be added to a device subscription list stored at the HSS. The registration information may include the identification information and the network credential of the device. In some examples, registering the device involves providing a network entity with access restrictions for the device.

Figure 6:
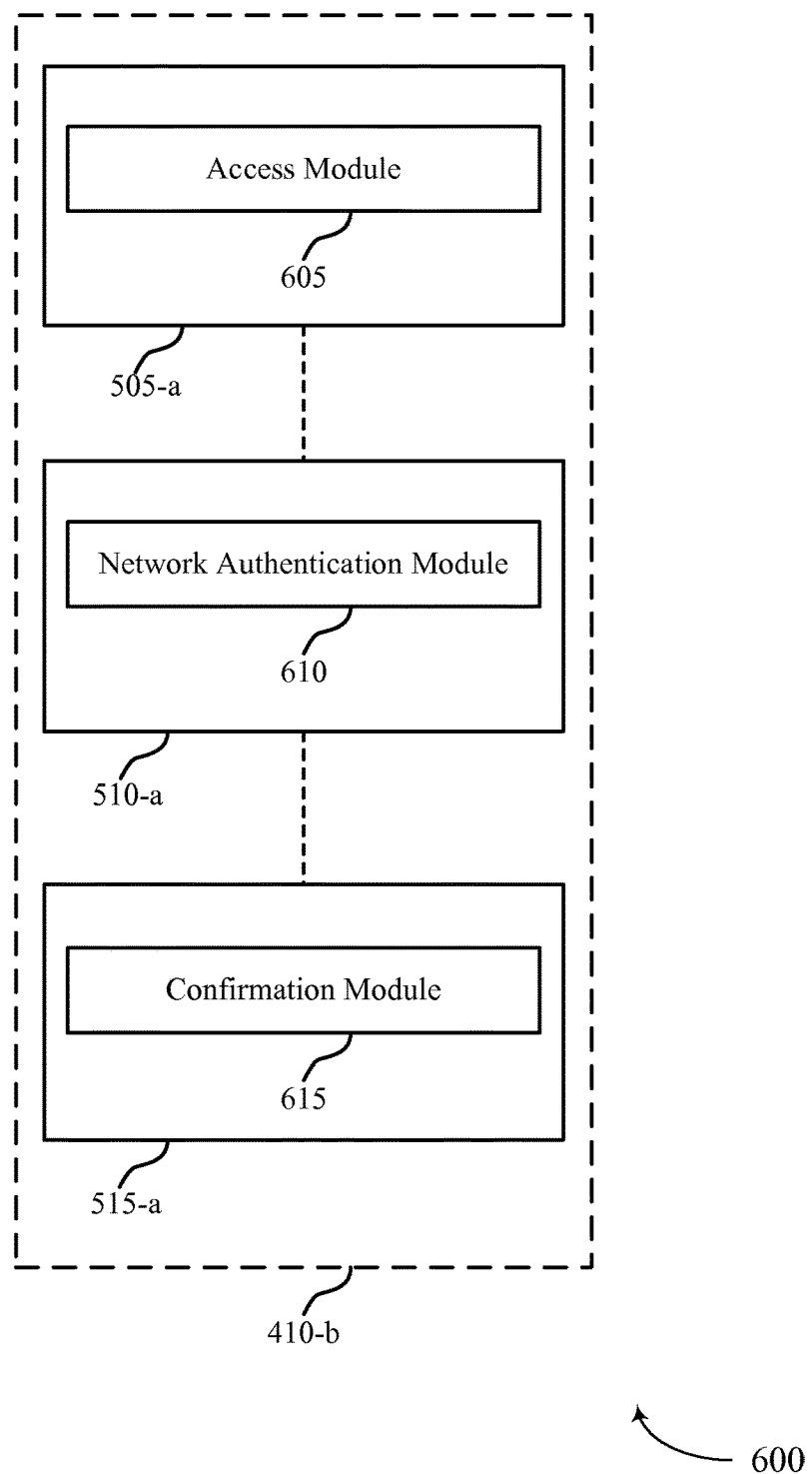
FIG. 6 shows a block diagram of an exemplary device subscription administration server configured according to the present disclosure.

FIG. 6 shows a block diagram 600 of an exemplary subscription administration module 410-*b* configured for associating a device with a UE network subscription in accordance with various embodiments. The subscription administration module 410-*b* may be an example of one or more aspects of a subscription administration module 410 described with reference to FIGS. 4-5. The subscription administration module 410-*b* may include a connection module 505-*a*, an identification module 510-*a*, and an association module 515-*a*. Each of these modules may perform the functions described above with reference to FIG. 5. The connection module 505-*a* may further include an access module 605. The identification module 510-*a* may further include a network authentication module 610. The association module 515-*a* may further include a confirmation module 615.

The components of the subscription administration module 410-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The access module 605 may be configured to send wireless access parameters for the device over the connection to a UE 115 as described above with reference to FIG. 3. In some examples, the access parameters may include at least one of: a network credential, a subscription identity associated with the network credential of the UE, a network identifier, a public key of the network, and/or a public key certificate of the network. In some examples, the subscription identity may include a GUTI or an IMSI of the UE and the network identifier comprises a network certificate, a public key, and/or a PLMN identity. Additionally or alternatively, the access restrictions may include access time duration limits, time of use specifications, maximum bandwidth limits, service parameters, uplink throughput limits, and/or downlink throughput limits.

The network authentication module 610 may be configured to authenticate the identification information for the device as described above with reference to FIG. 3. The network authentication module 610 may also be configured to send a message to a device authentication server. In some examples, the network authentication module 610 is configured to receive a response from the device authentication server; and authenticating the identification information may be based on the response. The identification information may include a shared key, or a public key of the device. The network authentication module 610 may also be configured to receive an authentication request for the device from the UE 115 via the connection as described with reference to FIG. 3. Additionally or alternatively, the network authentication module 610 may be configured to send an authentication acknowledgement for the device to the UE 115 via the connection.

The confirmation module 615 may be configured to send a device registration confirmation message to a UE 115 upon registering the device with the network entity as described above with reference to FIG. 3.

Figure 7:
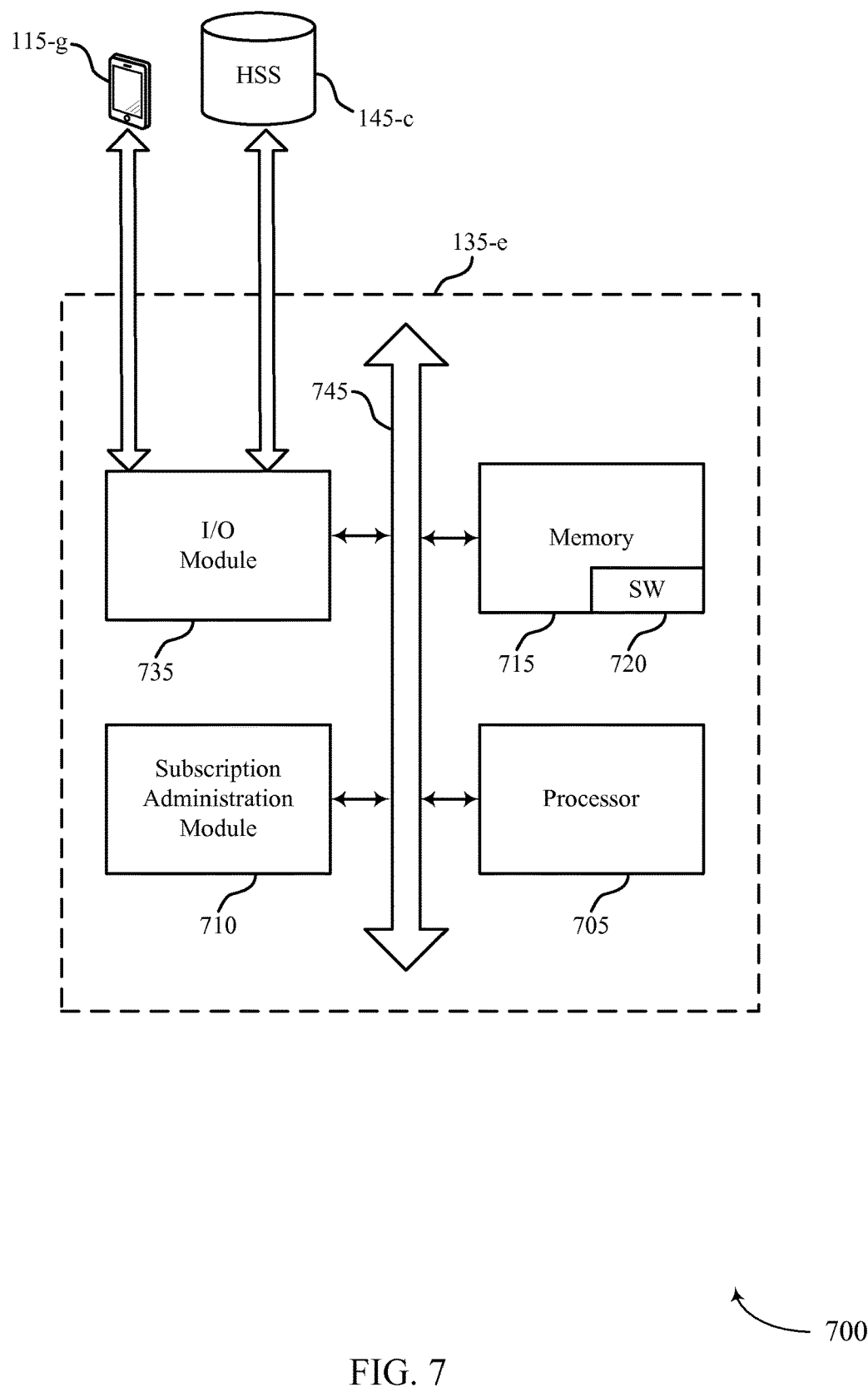
FIG. 7 illustrates a block diagram of an exemplary system that supports associating a device with another device's network subscription in accordance with the present disclosure.

FIG. 7 shows a diagram of a system 700 which supports associating a device with a UE network subscription in accordance with various embodiments. System 700 may include a device subscription administration server 135-*e*, which may be an example of a device subscription administration server 135 described with reference to FIGS. 1-6. The device subscription administration server 135-*e* may include a subscription administration module 710, which may be an example of a subscription administration module described with reference to FIGS. 4-6.

The device subscription administration server 135-*e* may also include a processor module 705, memory 715 (including software (SW)) 720, and an input/output (I/O) module 735, which each may communicate, directly or indirectly, with each other (e.g., via one or more buses 745). The I/O module 735 may be configured to communicate bi-directionally with a UE 115-*g*, an HSS 145-*c*, and other network entities. I/O module 735 may support communication with other elements of system 700, to include sending and receiving messages or other signaling. I/O module 735 may include suitable means for performing such communication.

The memory 715 may include random access memory (RAM) and read only memory (ROM). The memory 715 may store computer-readable, computer-executable software/firmware code 720 containing instructions that are configured to, when executed, cause the processor module 705 to perform various functions described herein (e.g., establish a connection with a UE, obtain identification information for a device from the UE, register the device with a network entity, etc.). Alternatively, the software/firmware code 720 may not be directly executable by the processor module 705 but be configured to cause a computer (e.g., when compiled and executed) to perform functions described herein.

The processor module 705 may include an intelligent hardware device, e.g., a central processing unit (CPU), a microcontroller, an ASIC, etc. Under control of processor 705, device subscription administration server 135-*e* may be configured to implement the methods, algorithms, and/or functions described in FIGS. 2-6. In particular, processor 705 may coordinate the operation of other modules to interact with a UE 115 and network elements (e.g., MME 140 and HSS 145) to facilitate device registration.

Figure 8:
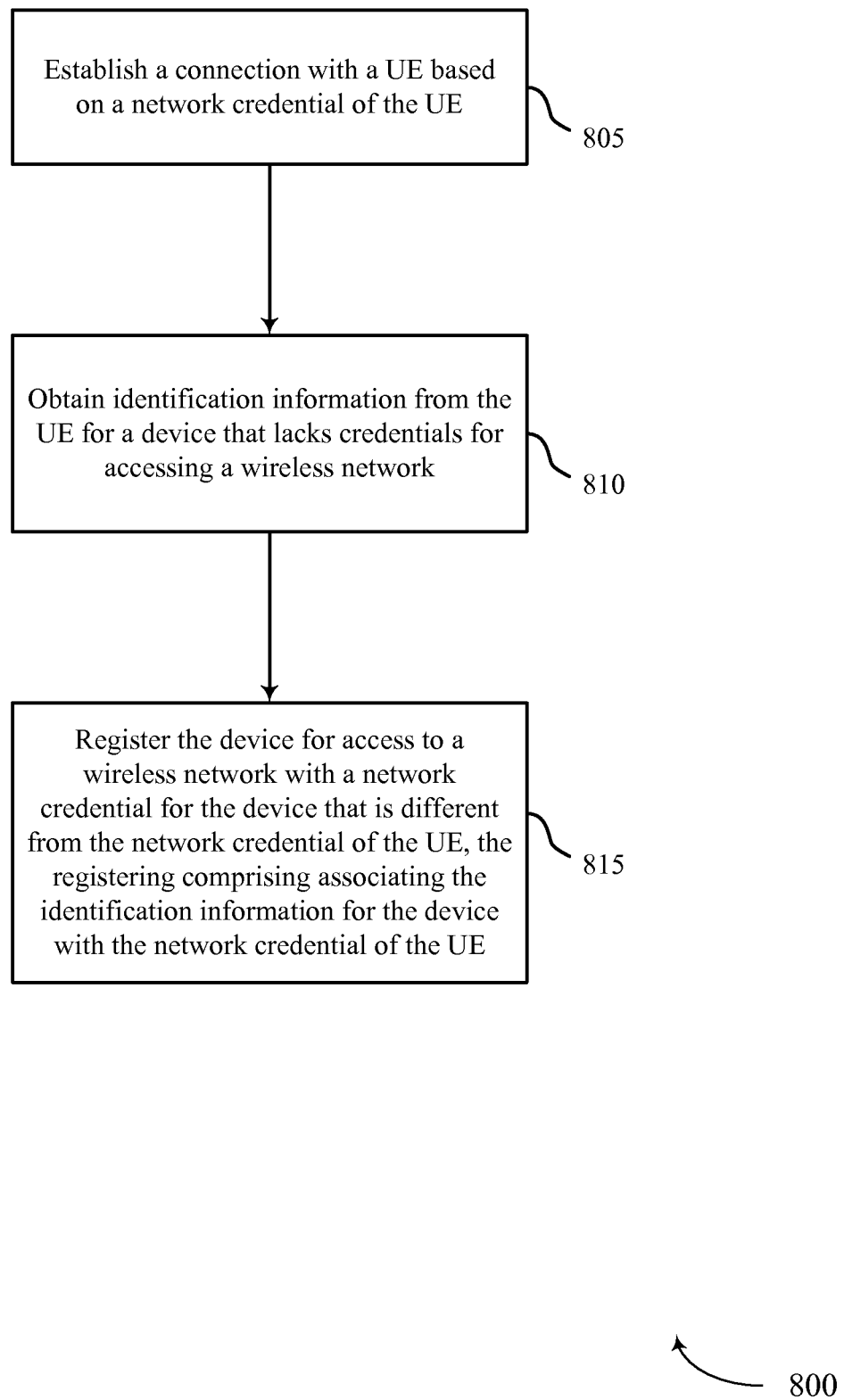
FIG. 8 illustrates a method for associating a device with another device's network subscription in accordance with the present disclosure.

FIG. 8 shows a flowchart 800 illustrating a method for associating a device with a UE network subscription in accordance with various embodiments. In certain examples, the blocks of the flowchart 800 may be performed by the device subscription administration server 135 as described with reference to FIGS. 1-7.

At block 805, the device subscription administration server 135 may establish a connection with a UE 115 based on a network credential of the UE 115 as described above with reference to FIG. 3. In certain examples, the functions of block 805 may be performed by the connection module 505 as described above with reference to FIG. 5.

At block 810, the device subscription administration server 135 may obtain identification information for a device from the UE over the connection as described above with reference to FIG. 3. The device may lack credentials for accessing a wireless network. In certain examples, the functions of block 810 may be performed by the identification module 510 as described above with reference to FIG. 5.

At block 815, the device subscription administration server 135 may register the device for access to a wireless network with a network credential for the device that is different from the network credential of the UE as described above with reference to FIG. 3, where the registration may include associating the identification information for the device with the network credential of the UE 115. That the device has its own credentials that are different/separate from those of the UE enables the device to access out-of-band network, i.e., a wireless network (e.g., non-cellular network) that is different from the serving network (e.g., cellular network) of the UE. In certain examples, the functions of block 815 may be performed by the association module 515 as described above with reference to FIG. 5.

Figure 9:
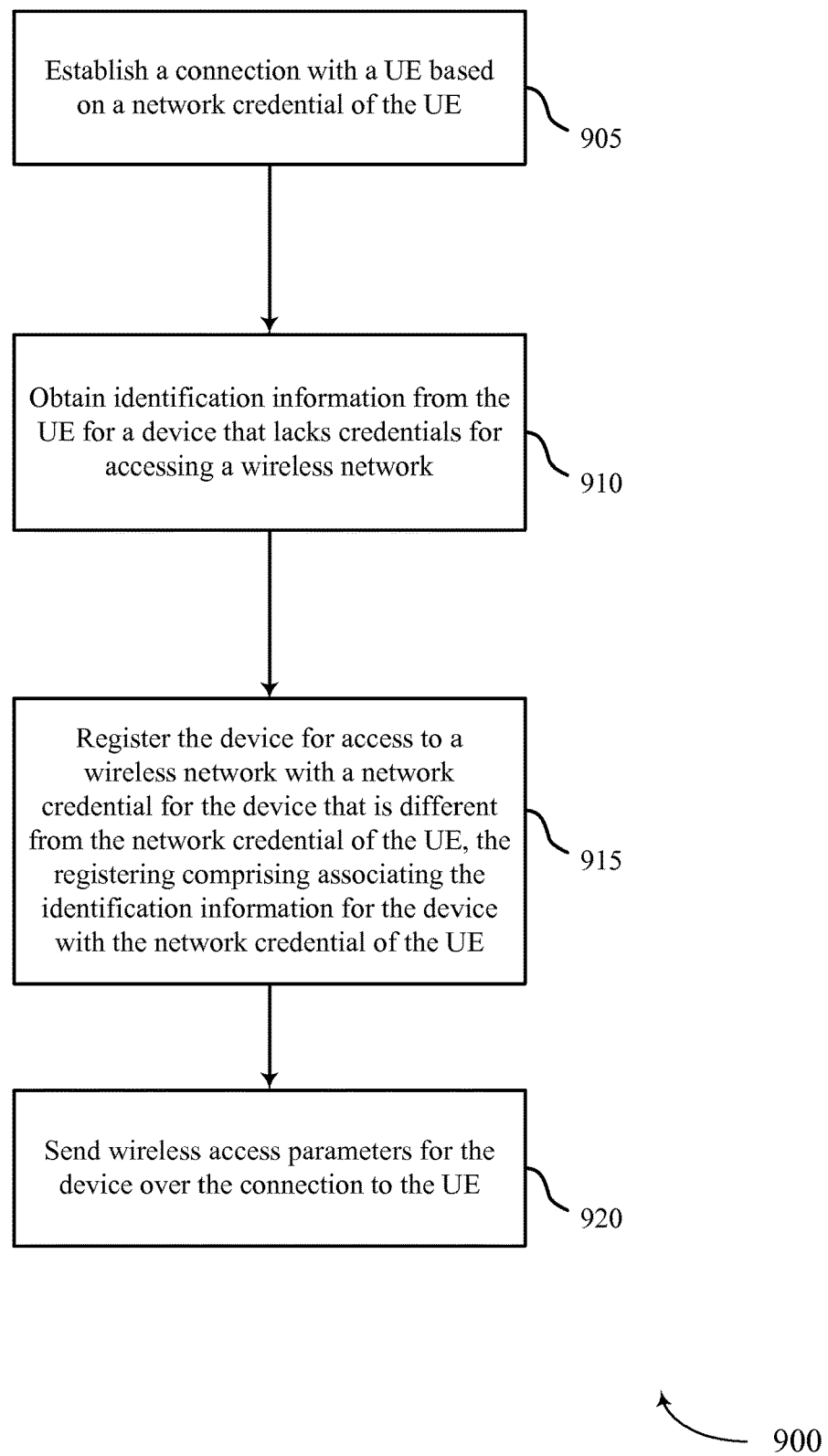
FIG. 9 illustrates a method for associating a device with another device's network subscription in accordance with the present disclosure.

FIG. 9 shows a flowchart 900 illustrating a method for associating a device with a UE network subscription in accordance with various embodiments. In certain examples, the blocks of the flowchart 900 may be performed by the device subscription administration server 135 as described with reference to FIGS. 1-7. The method described in flowchart 900 may also incorporate aspects of flowchart 800 of FIG. 8.

At block 905, a device subscription administration server 135 may establish a connection with a UE 115 based on a network credential of the UE 115 as described above with reference to FIG. 3. In certain examples, the functions of block 905 may be performed by the connection module 505 as described above with reference to FIG. 5.

At block 910, the device subscription administration server 135 may obtain identification information for a device from a UE 115 over a connection with the UE as described above with reference to FIG. 3. The device may lack credentials for accessing a wireless network. In certain examples, the functions of block 910 may be performed by the identification module 510 as described above with reference to FIG. 5.

At block 915, the device subscription administration server 135 may register the device for access to a wireless network with a network credential for the device that is different from the network credential of the UE as described above with reference to FIG. 3. The registration may include associating the identification information for the device with the network credential of the UE 115. In certain examples, the functions of block 915 may be performed by the association module 515 as described above with reference to FIG. 5.

At block 920, the device subscription administration server 135 may send wireless access parameters for the device over the connection to the UE 115 as described above with reference to FIG. 3. In certain examples, the functions of block 920 may be performed by the access module 605 as described above with reference to FIG. 6.

Figure 10:
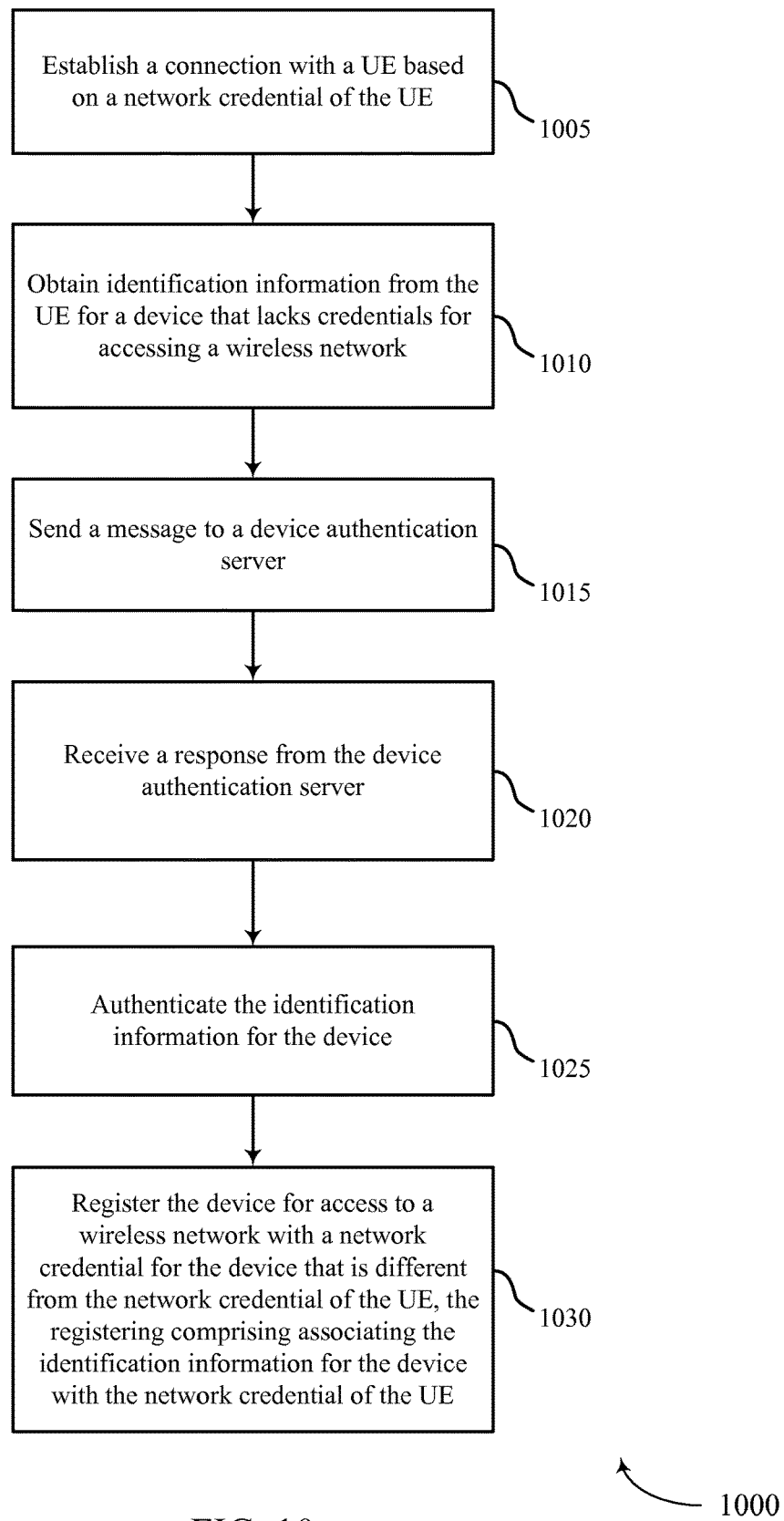
FIG. 10 illustrates a method for associating a device with another device's network subscription in accordance with the present disclosure.

FIG. 10 shows a flowchart 1000 illustrating a method for associating a device with a UE network subscription in accordance with various embodiments. In certain examples, the blocks of the flowchart 1000 may be performed by the device subscription administration server 135 as described with reference to FIGS. 1-6 and 7. The method described in flowchart 1000 may also incorporate aspects of flowcharts 800 to 900 of FIGS. 8-9.

At block 1005, the device subscription administration server 135 may establish a connection with a UE based on a network credential of the UE as described above with reference to FIG. 3. In certain examples, the functions of block 1005 may be performed by the connection module 505 as described above with reference to FIG. 5.

At block 1010, the device subscription administration server 135 may obtain identification information for a device from the UE over the connection as described above with reference to FIG. 3. The device may lack credentials for accessing a wireless network. In certain examples, the functions of block 1010 may be performed by the identification module 510 as described above with reference to FIG. 5.

At block 1015, the device subscription administration server 135 may send a message to a device authentication server as described above with reference to FIG. 3. In certain examples, the functions of block 1015 may be performed by the network authentication module 610 as described above with reference to FIG. 6.

At block 1020, the device subscription administration server 135 may receive a response from the device authentication server as described above with reference to FIG. 3. In certain examples, the functions of block 1020 may be performed by the network authentication module 610 as described above with reference to FIG. 6.

At block 1025, the device subscription administration server 135 may authenticate the identification information for the device by the network server as described above with reference to FIG. 3. The authentication of the identification information may be based on the response received from the device authentication server. In certain examples, the functions of block 1025 may be performed by the network authentication module 610 as described above with reference to FIG. 6.

At block 1030, the device subscription administration server 135 may register the device for access to a wireless network with a network credential for the device that is different from the network credential of the UE as described above with reference to FIG. 3. The registration may include associating the identification information for the device with the network credential of the UE. In certain examples, the functions of block 1030 may be performed by the association module 515 as described above with reference to FIG. 5.

Figure 11:
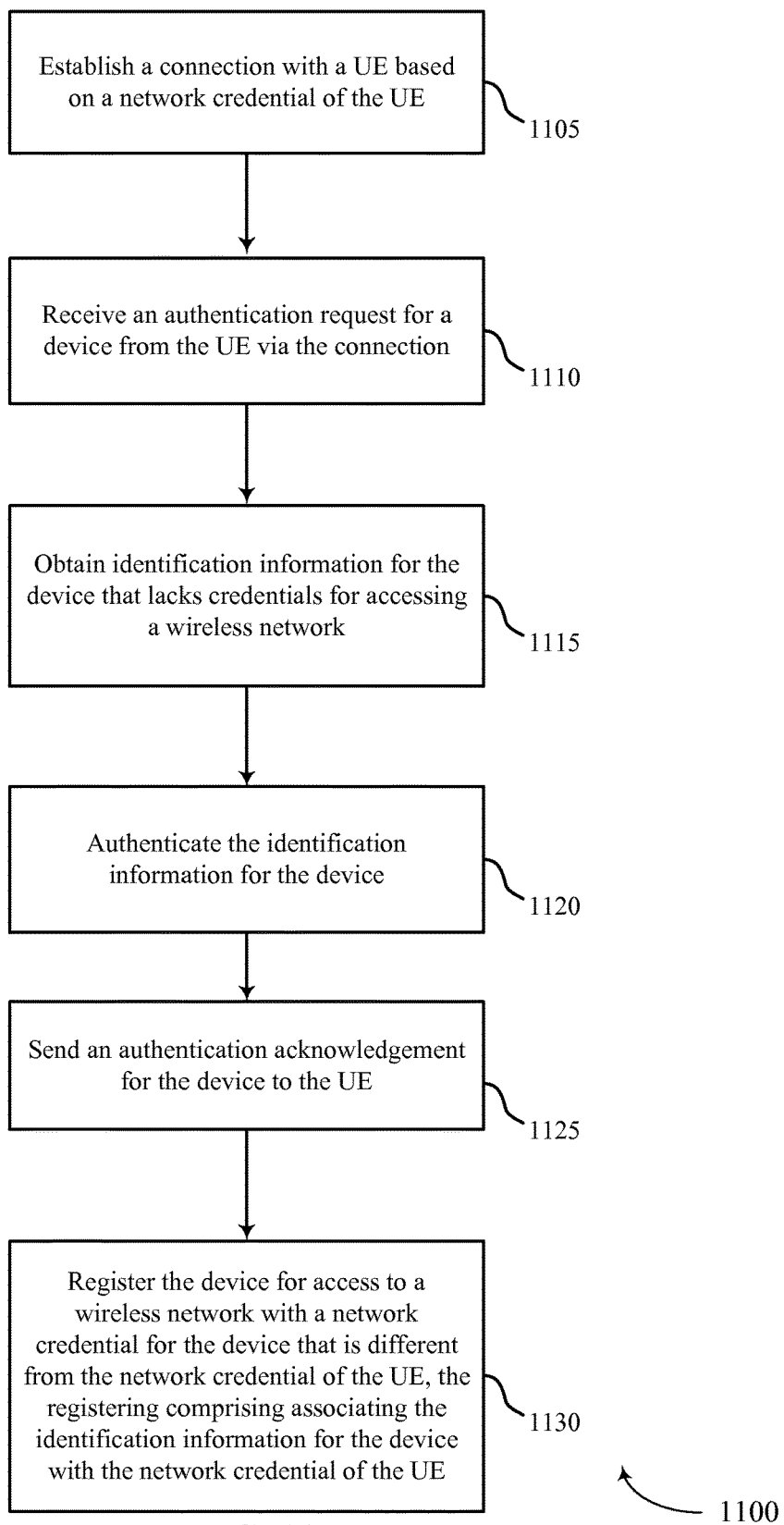
FIG. 11 illustrates a method for associating a device with another device's network subscription in accordance with the present disclosure.

FIG. 11 shows a flowchart 1100 illustrating a method for associating a device with a UE network subscription in accordance with various embodiments. In certain examples, the blocks of the flowchart 1100 may be performed by the device subscription administration server 135 as described with reference to FIGS. 1-6 and 7. The method described in flowchart 1100 may also incorporate aspects of flowcharts 800 to 1000 of FIGS. 8-10. In some cases, a UE 115 may establish access to a wireless network using a network credential prior to the steps of the method depicted in flowchart 1100.

At block 1105, the device subscription administration server 135 may establish a connection with a UE based on a network credential of the UE as described above with reference to FIG. 3. In certain examples, the functions of block 1105 may be performed by the connection module 505 as described above with reference to FIG. 5.

At block 1110, the device subscription administration server 135 may receive an authentication request for the device from the UE via the connection as described above with reference to FIG. 3. In certain examples, the functions of block 1110 may be performed by the network authentication module 610 as described above with reference to FIG. 6.

At block 1115, the device subscription administration server 135 may obtain identification information for the device from the UE over the connection as described above with reference to FIG. 3. The device may lack credentials for accessing a wireless network. In certain examples, the functions of block 1115 may be performed by the identification module 510 as described above with reference to FIG. 5.

At block 1120, the device subscription administration server 135 may authenticate the identification information for the device as described above with reference to FIG. 3. In certain examples, the functions of block 1120 may be performed by the network authentication module 610 as described above with reference to FIG. 6.

At block 1125, the UE 115 may send an authentication acknowledgement for the device to the UE via the connection as described above with reference to FIG. 3. In certain examples, the functions of block 1125 may be performed by the network authentication module 610 as described above with reference to FIG. 6.

At block 1130, the device subscription administration server 135 may register the device for access to a wireless network with a network credential for the device that is different from the network credential of the UE as described above with reference to FIG. 3. The registration may include associating the identification information for the device with the network credential of the UE. In certain examples, the functions of block 1130 may be performed by the association module 515 as described above with reference to FIG. 5.

Figure 12:
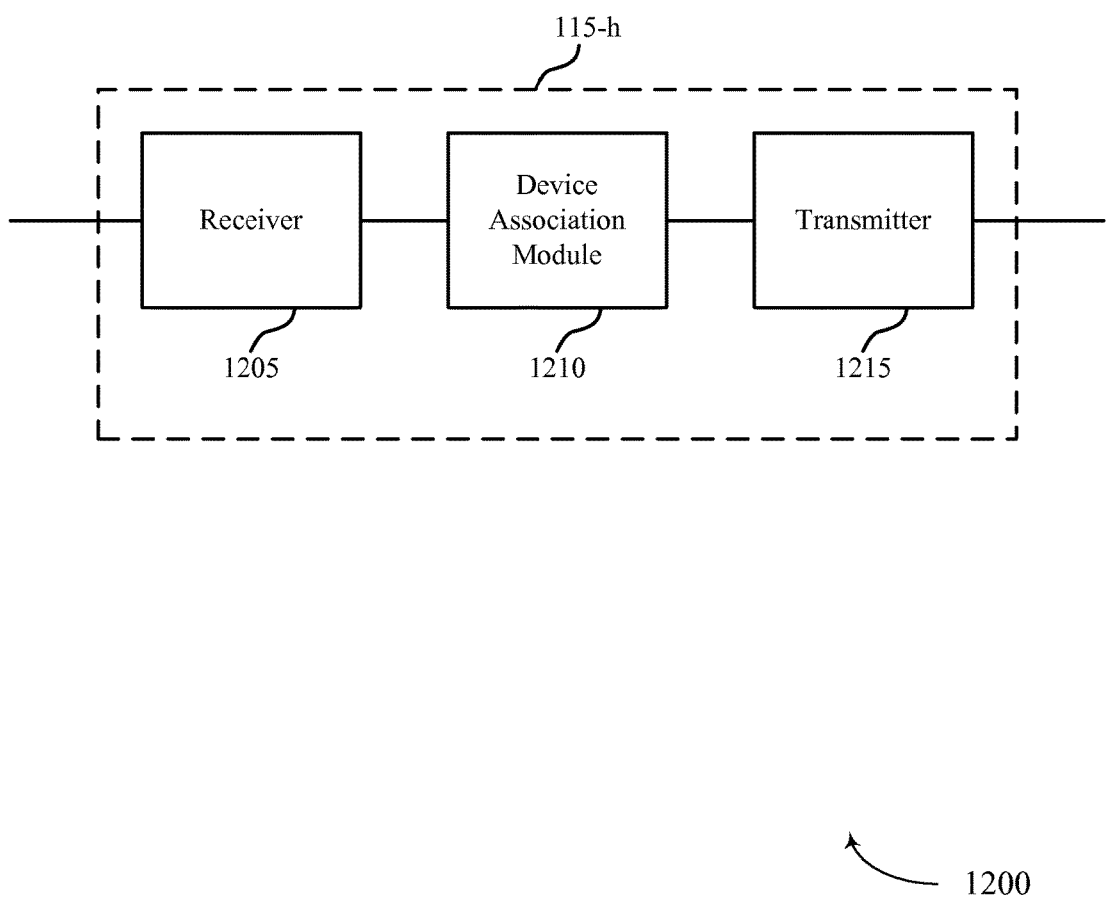
FIG. 12 shows a block diagram of an exemplary device configured according to the present disclosure.

FIG. 12 shows a block diagram 1200 of a UE 115-*h* configured for associating a device with a UE network subscription in accordance with various embodiments. The UE 115-*h* may also be referred to as an apparatus or a device. The UE 115-*h* may be an example of one or more aspects of a UE 115 described with reference to FIGS. 1-3. The UE 115-*h* may also be referred to as an apparatus or a device. The UE 115-*h* may include a receiver 1205, a device association module 1210, and/or a transmitter 1215. The UE 115-*h* may also include a processor. Each of these components may be in communication with each other.

The components of the UE 115-*h* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 1205 may receive information such as packets, user data, and/or control information associated with various information channels (e.g., control channels, data channels, etc.). Information may be passed on to the device association module 1210, and to other components of the UE 115-*h*. For example, receiver 1205 may receive messages from a core network 130 via a base station 105 relevant to registering a device with the network. In some examples, the receiver 1205 may receive wireless access parameters for the device 115-*e*.

The device association module 1210 may be configured to obtain identification information for a device that lacks access credentials. The device association module 1210 may also be configured to establish a connection with the wireless network based on a network credential of the UE 115-*h*. The device association module 1210 may be configured to send identification information for the device to a device subscription administration server to register the device to access to the wireless network with a network credential, and the registration may include associating the identification information for the device with the network credential of the UE 115-*h* at the wireless network.

The transmitter 1215 may transmit the one or more signals received from other components of the UE 115-*h*. For example, transmitter 1215 may transmit messages to a core network 130 (FIGS. 1 and 2) via a base station 105 (FIGS. 1 and 2) relevant to registering a device with the network. In some examples, the transmitter 1215 may be collocated with the receiver 1205 in a transceiver module. The transmitter 1215 may include a single antenna, or it may include several antennas.

Figure 13:
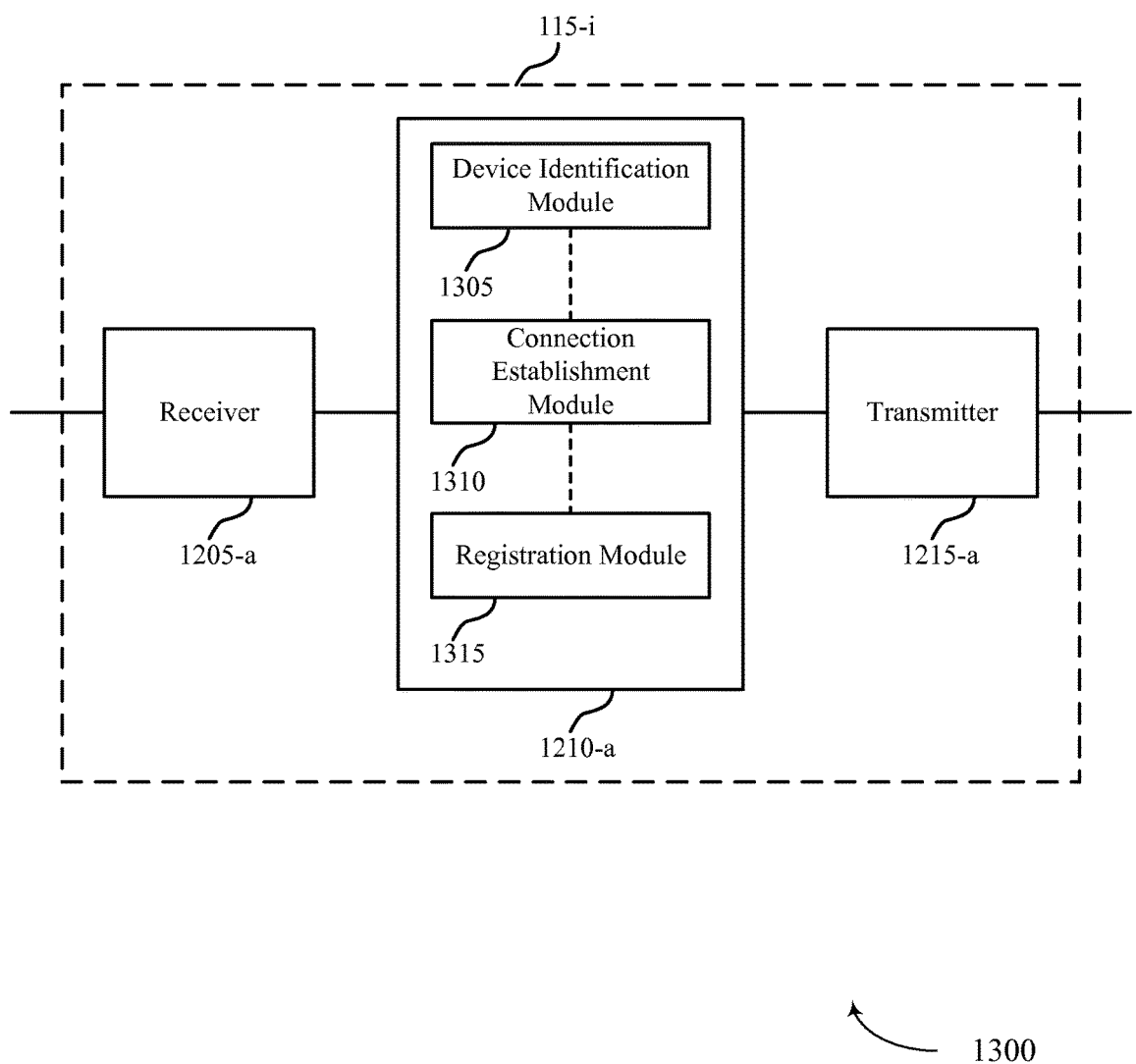
FIG. 13 shows a block diagram of an exemplary device configured according to the present disclosure.

FIG. 13 shows a block diagram 1300 of a UE 115-*i* configured for associating a device with a UE network subscription in accordance with various embodiments. The UE 115-*i* may be an example of one or more aspects of a UE 115 described with reference to FIGS. 1-3 and 12. The UE 115-*i* may also be referred to as an apparatus or a device. The UE 115-*i* may include a receiver 1205-*a*, a device association module 1210-*a*, and/or a transmitter 1215-*a*. The UE 115-*i* may also include a processor (not shown). Each of these components may be in communication with each other. The device association module 1210-*a* may also include a device identification module 1305, a connection establishment module 1310, and a registration module 1315.

The components of the UE 115-*i* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 1205-*a* may receive information which may be passed on to the device association module 1210-*a*, and to other components of the UE 115-*i*. The device association module 1210-*a* may be configured to perform the operations described above with reference to FIG. 12. The transmitter 415-*a* may transmit the one or more signals received from other components of the UE 115-*i*.

The device identification module 1305 may be configured to obtain identification information for a device as described above with reference to FIG. 3. In some cases, the device lacks credentials for accessing a wireless network. In some examples, the identification information for the device may be of a different kind than the network credential of the UE 115-*h*. In some examples, obtaining the identification information for the device over the local communication link may include at least one of: scanning a QR code, utilizing a WPAN connection, utilizing a USB link, utilizing a NFC link, utilizing a WLAN link, or accessing a URL. In some examples, the identification information for the device may include at least one of: a device identifier, device parameters, a URL, a shared key, a public key, or a certificate of the device, or any combination thereof.

The connection establishment module 1310 may be configured to establish a connection with the wireless network based on a network credential of the UE 115-*i* as described above with reference to FIG. 3. For example, connection establishment module 1310 may be configured to perform an attach procedure. In some examples, connection establishment module 1310 establishes a connection in coordination with a UICC (e.g., as described below).

The registration module 1315 may be configured to aid a network entity in registering the device. The network entity may be a device subscription administration server 135 as described above with reference to FIG. 3. In some examples, the registration module 1315 may send identification information for the device to the device subscription administration server to register the device for access to a wireless network with a network credential. In some cases, the registration may include associating the identification information for the device with the network credential of the UE 115-*i*, and the network credential may be different from the network credential of the UE. The registration module 1315 may also be configured to provide the device subscription administration server 135 with access restrictions for the device. In some examples, the access restrictions include access time duration limits, time of use specifications, maximum bandwidth limits, service parameters, uplink throughput limits, and/or downlink throughput limits. In some examples, registering the device at the wireless network may include sending a registration request for the device to the network via the connection. The registration module 1315 may also be configured to receive a registration acknowledgment for the device from the wireless network via the connection.

Figure 14:
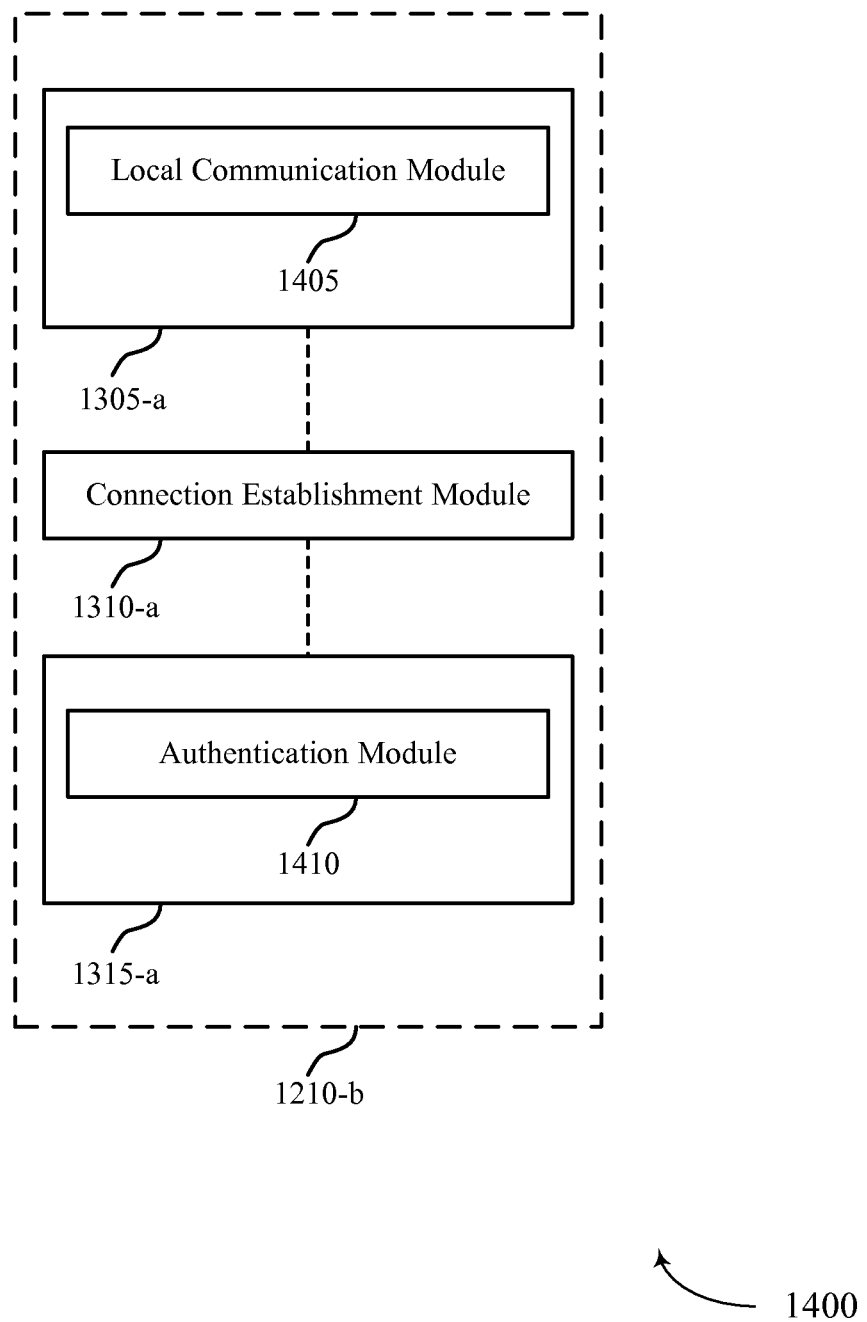
FIG. 14 shows a block diagram of an exemplary device configured according to the present disclosure.

FIG. 14 shows a block diagram 1400 of a device association module 1210-*b* configured for associating a device with a UE network subscription in accordance with various embodiments. The device association module 1210-*b* may be an example of one or more aspects of a device association module 1210 described with reference to FIGS. 12 and 13. The device association module 1210-*b* may include a device identification module 1305-*a*, a connection establishment module 1310-*a*, and a registration module 1315-*a*. Each of these modules may perform the functions described above with reference to FIG. 13. The device identification module 1305-*a* may further include a local communication module 1405. The registration module 1315-*a* may further include an authentication module 1410.

The components of the device association module 1210-*b* may, individually or collectively, be implemented with at least one ASIC adapted to perform some or all of the applicable functions in hardware. In some examples, the functions may be performed by one or more other processing units (or cores), on at least one IC. In other examples, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The local communication module 1405 may be configured to establish a local communication link with a device as described with reference to FIG. 3. In some cases the identification information for the device is obtained over the local communication link. The local communication module 1405 may also be configured to send access parameters to the device over the local communication link, and the access parameters may facilitate access to a wireless network by the device. In some examples, the access parameters may include at least one of: a network credential for the device, a subscription identity associated with the network credential of the UE, a network identifier, a public key of the network, or a public key certificate of the network, or any combination thereof. In some cases, the subscription identity may include a GUTI and/or an IMSI of the UE and the network identifier may include a network certificate, a public key, or a PLMN identity, or any combination thereof.

The authentication module 1410 may be configured to authenticate the identification information for the device by the UE 115 as described with reference to FIG. 3. The authentication module 1410 may also be configured to determine that the device is allowed to be registered with the network. Additionally or alternatively, the authentication module 1410 may be configured to send an authentication request to a device subscription administration server. The authentication module 1410 may also be configured to receive an authentication response from the device subscription administration server, and to authenticate the identification information for the device based on the authentication response.

Figure 15:
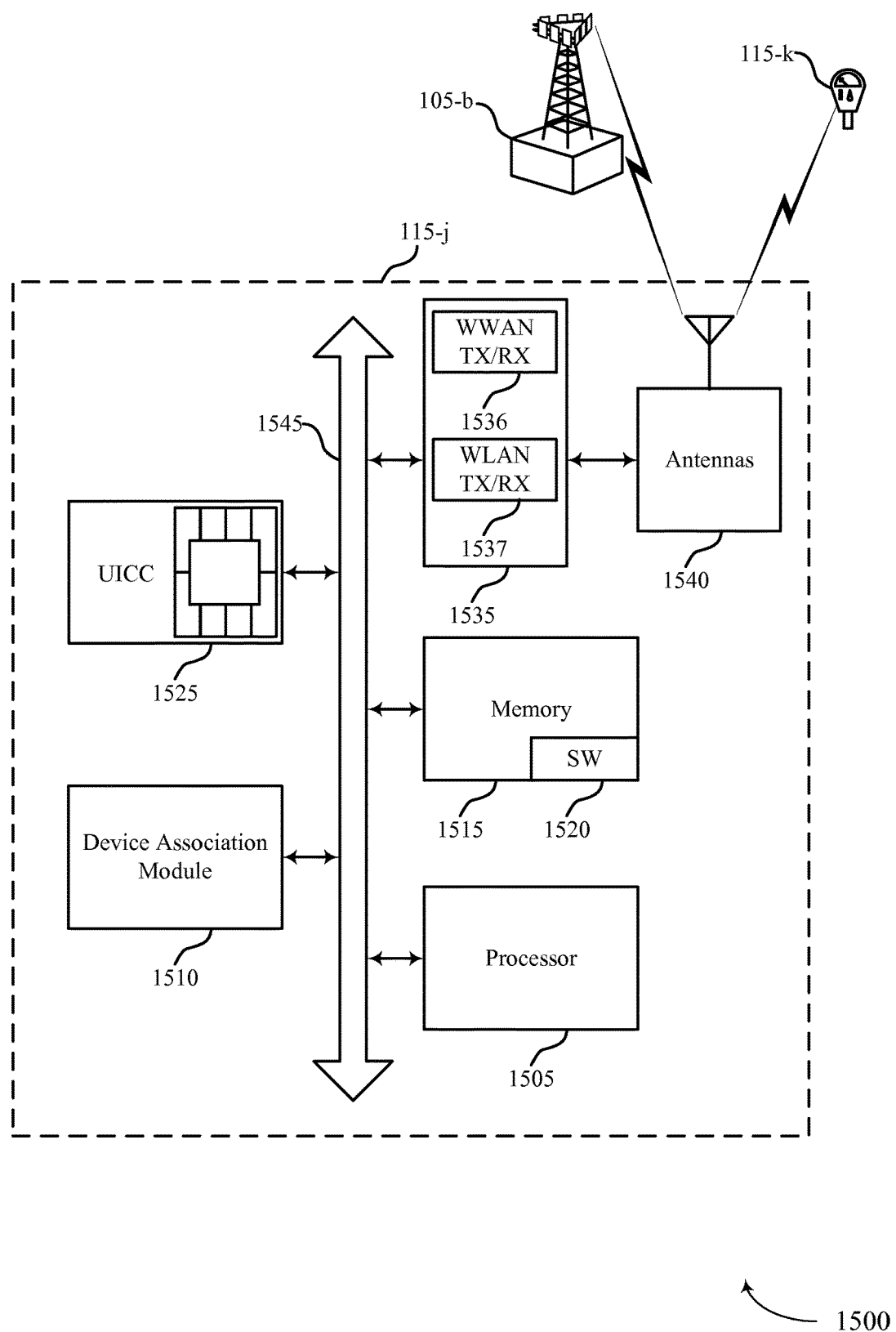
FIG. 15 illustrates a block diagram of an exemplary system that supports associating a device with another device's network subscription in accordance with the present disclosure.

FIG. 15 shows a diagram of a system 1500 which supports associating a device with a UE network subscription in accordance with various embodiments. System 1500 may include a UE 115-*j*, which may be an example of a UE 115 with a network credential described with reference to FIGS. 1-6. The UE 115-*j* may include a device association module 1510, which may be an example of a device association module described with reference to FIGS. 4-6. The UE 115-*j* may also include a UICC 1525. The UE 115-*i* may include components for bi-directional voice and data communications, including components for transmitting communications and components for receiving communications. For example, UE 115-*j* may communicate with a base station 105-*b* and/or a device 115-*k* (e.g., over a local communications link, which may or may not be a wireless link). The device 115-*k* may be an MTC device, as described above with reference to FIGS. 1-3.

The UICC 1525 may be an integrated circuit that securely stores subscriber information, including an IMSI and related keys used to identify and authenticate UE 115-*i*. UICC 1525 may also contain a unique serial number, e.g., an integrated circuit card ID (ICCID), security authentication and ciphering information, temporary information related to the local network, a list of the services, a personal identification number (PIN), and a personal unblocking code (PUK) for PIN unlocking. In some cases, UICC 1525 may be a circuit embedded in a removable plastic card.

The UE 115-*j* may also include a processor module 1505, and memory 1515 (including software (SW) 1520, a transceiver module 1535, and one or more antenna(s) 1540, which each may communicate, directly or indirectly, with each other (e.g., via one or more buses 1545). The transceiver module 1535 may be configured to communicate bi-directionally, via the antenna(s) 1540 and/or one or more wired or wireless links, with one or more networks, as described above. For example, the transceiver module 1535 may be configured to communicate bi-directionally with a base station 105-*b*. The transceiver module 1535 may include a modem configured to modulate packets and provide the modulated packets to the antenna(s) 1540 for transmission, and to demodulate packets received from the antenna(s) 1540. While the UE 115-*j* may include a single antenna 1540, the UE 115-*j* may also have multiple antennas 1540 capable of concurrently transmitting and/or receiving multiple wireless transmissions. The transceiver module 1535 may also be capable of concurrently communicating with one or more base stations 105. Transceiver 1535 may be configured to communicate over multiple networks using different radio access technologies (RATs). For example, transceiver 1535 may be configured to communicate of a wireless wide area network (WWAN) using a WWAN TX/RX module 1536 and with a WLAN using a WLAN TX/RX module 1537. A WLAN may be an example of a local communications link described above.

The memory 1515 may include RAM and ROM. The memory 1515 may store computer-readable, computer-executable software/firmware code 1520 containing instructions that are configured to, when executed, cause the processor module 1505 to perform various functions described herein (e.g., obtaining identification information, establishing a connection with the wireless network, registering the device, etc.). Alternatively, the software/firmware code 1520 may not be directly executable by the processor module 1505 but be configured to cause a computer (e.g., when compiled and executed) to perform functions described herein. The processor module 1505 may include an intelligent hardware device, e.g., a CPU, a microcontroller, an ASIC, etc.

Figure 16:
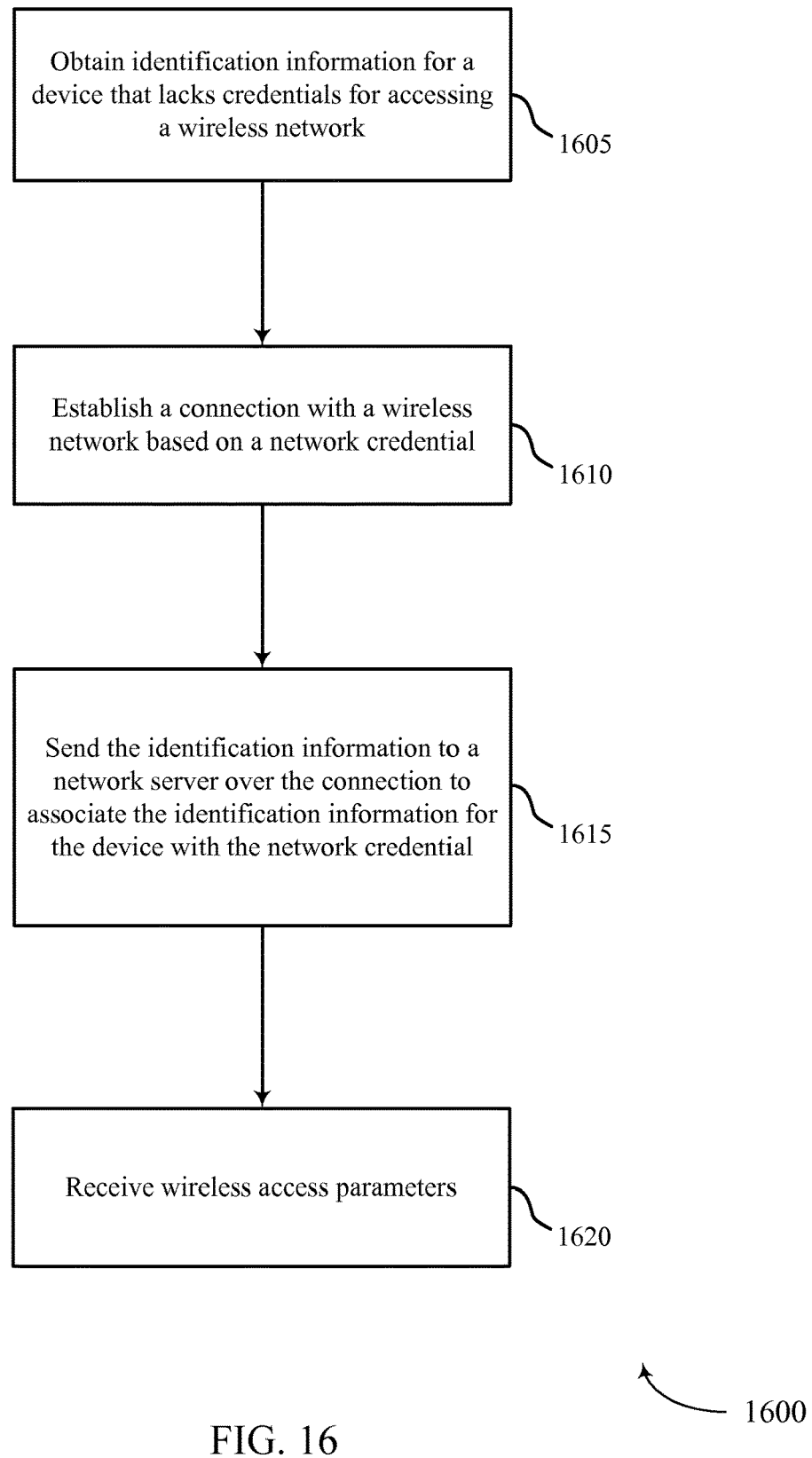
FIG. 16 illustrates a method for associating a device with another device's network subscription in accordance with the present disclosure.

FIG. 16 shows a flowchart 1600 illustrating a method for associating a device with a UE network subscription in accordance with various embodiments. The functions of flowchart 1600 may be implemented by a UE 115 or its components as described with reference to FIGS. 1-3, and 12-15. In certain examples, the blocks of the flowchart 1600 may be performed by a device association module 1210, 1510 as described with reference to FIGS. 12-15.

At block 1605, the UE 115 may obtain identification information for a device as described above with reference to FIG. 3. The device may lack credentials for accessing a wireless network. In certain examples, the functions of block 1605 may be performed by the device identification module 1305 as described above with reference to FIG. 13.

At block 1610, the UE 115 may establish a connection with a wireless network based on a network credential of the UE 115 as described above with reference to FIG. 3. In certain examples, the functions of block 1610 may be performed by the connection establishment module 1310 as described above with reference to FIG. 13.

At block 1615, the UE 115 may send the identification information to a network server (e.g., device subscription administration server 135) over the connection to associate the identification information for the device with the network credential of the UE as described above with reference to FIG. 3. In certain examples, the functions of block 1615 may be performed by the registration module 1315 as described above with reference to FIG. 13.

At block 1620, the UE 115 may receive wireless access parameters for the device over the connection as described above with reference to FIG. 3. In certain examples, the functions of block 1620 may be performed by the receiver 1205 as described above with reference to FIG. 12.

Figure 17:
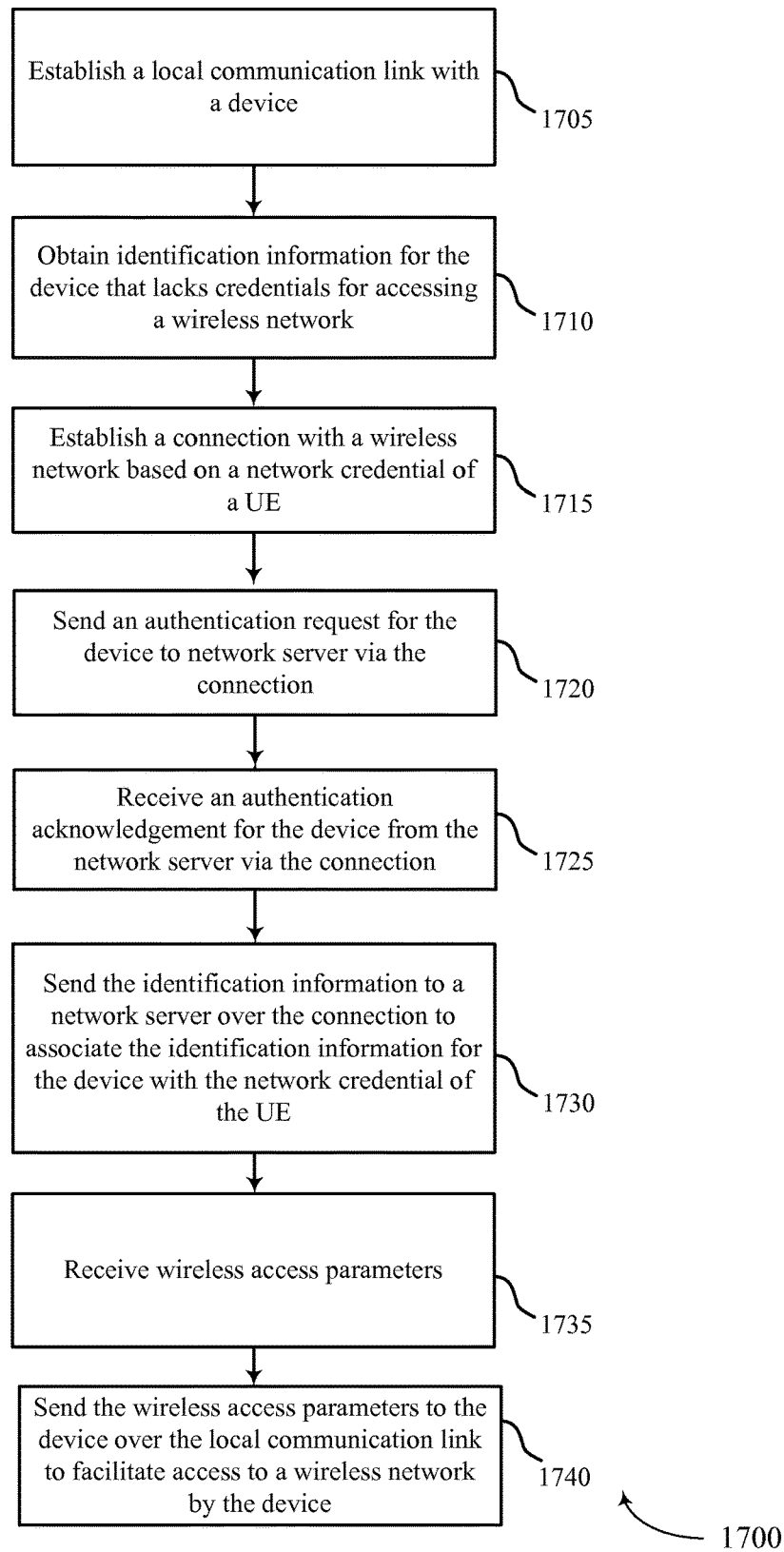
FIG. 17 illustrates a method for associating a device with another device's network subscription in accordance with the present disclosure.

FIG. 17 shows a flowchart 1700 illustrating a method for associating a device with a UE network subscription in accordance with various embodiments. The functions of flowchart 1700 may be implemented by a UE 115 or its components as described with reference to FIGS. 1-3, and 12-15. In certain examples, the blocks of the flowchart 1700 may be performed by a device association module as described with reference to FIGS. 12-15.

At block 1705, the UE 115 may establish a local communication link with a device as described above with reference to FIG. 3. The device lacks credentials for accessing a wireless network. In certain examples, the functions of block 1705 may be performed by the local communication module 1405 as described above with reference to FIG. 14.

At block 1710, the UE 115 may obtain identification information for a device as described above with reference to FIG. 3. The identification information for the device may be obtained over the local communication link. In certain examples, the functions of block 1710 may be performed by the device identification module 1305 as described above with reference to FIG. 13.

At block 1715, the UE 115 may establish a connection with a wireless network based on a network credential of the UE 115 as described above with reference to FIG. 3. In certain examples, the functions of block 1715 may be performed by the connection establishment module 1310 as described above with reference to FIG. 13.

At block 1720, the UE 115 may send an authentication request for the device to a network server (e.g., device subscription administration server 135) via the connection as described above with reference to FIG. 3. In certain examples, the functions of block 1720 may be performed by authentication module 1410 as described above with reference to FIG. 14.

At block 1725, the UE 115 may receive an authentication acknowledgement for the device from the network server via the connection as described above with reference to FIG. 3. In certain examples, the functions of block 1725 may be performed by the authentication module 1410 as described above with reference to FIG. 14.

At block 1730, the UE 115 may send the identification information for the device to the network server (e.g., a device subscription administration server 135) over the connection to associate the identification information for the device with the network credential of the UE 115 as described above with reference to FIG. 3. In certain examples, the functions of block 1730 may be performed by the registration module 1315 as described above with reference to FIG. 13.

At block 1735, the UE 115 may receive wireless access parameters for the device over the connection as described above with reference to FIG. 3. In certain examples, the functions of block 1735 may be performed by the receiver 1205 as described above with reference to FIG. 12.

At block 1740, the UE 115 may send the wireless access parameters to the device over the local communication link to facilitate access to a wireless network by the device as described above with reference to FIG. 3. In certain examples, the functions of block 1735 may be performed by the local communication module 1405 as described above with reference to FIG. 14.

It should be noted that the methods illustrated by flowcharts 800, 900, 1000, 1100, 1600 and 1700 are example implementations, and that the operations of the method, and the steps may be rearranged or otherwise modified such that other implementations are possible.

The detailed description set forth above in connection with the appended drawings describes example embodiments and does not represent the only embodiments that may be implemented or that are within the scope of the claims. The term "exemplary" as used herein means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on a computer-readable storage medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C, or any combination thereof" means A or B or C or AB or AC or BC or ABC (i.e., A and B and C).

Computer-readable media includes both computer readable storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable storage media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication performed by a network server, comprising:
   establishing a connection with a user equipment (UE) based on a network credential of the UE;
   obtaining identification information from the UE for a device that lacks credentials for accessing a wireless network;
   sending a message to a device authentication server;
   authenticating the identification information for the device via the device authentication server;
   registering the device for access to the wireless network with a network credential for the device that is different from the network credential of the UE after authenticating the identification information for the device, the registering comprising associating the identification information for the device with the network credential of the UE; and
   receiving a request for access from the device, the request for access being independent of the UE subsequent to registering the device for access to the wireless network.

2. The method of claim 1, further comprising:
   receiving a response from the device authentication server, wherein the authentication of the identification information is based on the response from the device authentication server.

3. The method of claim 1, wherein the network credential for the device comprises a shared key provisioned by a device manufacturer.

4. The method of claim 1, wherein the network credential for the device comprises a private-public key pair provisioned by a device manufacturer.

5. The method of claim 1, further comprising:
   sending a device registration confirmation message to the UE upon registering the device.

6. The method of claim 1, wherein registering the device comprises:
   sending registration information to a home subscriber server (HSS) of the UE to be added to a device subscription list stored at the HSS, wherein the registration information comprises the identification information and the network credential for the device.

7. The method of claim 1, wherein the identification information for the device comprises at least one of:
   a device identifier, device parameters, a uniform resource locator (URL), a shared key, a public key, or a public key certificate of the device, or any combination thereof.

8. The method of claim 1, wherein registering the device comprises:
   providing a network entity with access restrictions for the device.

9. The method of claim 8, wherein the access restrictions comprise at least one of:
   access time duration limits, time of use specifications, maximum bandwidth limits, service parameters, uplink throughput limits, or downlink throughput limits, or any combination thereof.

10. The method of claim 1, further comprising:
    receiving an authentication request for the device from the UE via the connection; and
    sending an authentication acknowledgement for the device to the UE via the connection.

11. The method of claim 1, wherein the identification information for the device is of a different kind than the network credential of the UE.

12. The method of claim 1, wherein the network credential of the UE is provisioned by an operator of the wireless network and the identification information for the device is established by a manufacturer of the device.

13. The method of claim 1, wherein the identification information for the device comprises a global unique network identifier.

14. The method of claim 1, further comprising:
    receiving a deregistration request for the device;
    approving the deregistration request; and
    removing access for the device based at least in part on approving the deregistration request.

15. A method of wireless communication performed by a user equipment (UE), comprising:
    obtaining identification information for a device that lacks credentials for accessing a wireless network, wherein the device is a physical hardware device that is separate from the UE;
    establishing a connection with the wireless network based on a network credential of the UE;
    sending the identification information for the device to a network server over the connection to associate, at the network server, the identification information for the device with the network credential of the UE;
    sending an authentication request for the device to the network server for authentication via a device authentication server; and
    managing a subscription for the device on the wireless network, wherein wireless access for the device on the wireless network is established independently of the UE.

16. The method of claim 15, further comprising:
    establishing a local communication link with the device, wherein the identification information for the device is obtained over the local communication link.

17. The method of claim 15, further comprising:
    receiving an authentication response for the device from the network server via the connection.

18. The method of claim 15, wherein the wireless access parameters comprise a global unique network identifier.

19. The method of claim 15, further comprising:
sending a deregistration request for the device to the network server.

20. An apparatus for wireless communication, comprising:
means for establishing a connection with a user equipment (UE) based on a network credential of the UE;
means for obtaining identification information from the UE for a device that lacks credentials for accessing a wireless network, wherein the device is a physical hardware device that is separate from the UE;
means for sending a message to a device authentication server;
means for authenticating the identification information for the device via the device authentication server;
means for registering the device for access to the wireless network with a network credential for the device that is different from the network credential of the UE after authenticating the identification information for the device, the registering comprising associating the identification information for the device with the network credential of the UE; and
means for receiving a request for access from the device, the request for access being independent of the UE subsequent to registering the device for access to the wireless network.

21. The apparatus of claim 20, further comprising:
means for receiving a response from the device authentication server, wherein the means for authenticating are operative to authenticate the identification information based on the response from the device authentication server.

22. The apparatus of claim 20, wherein the network credential for the device comprises a shared key provisioned by a device manufacturer.

23. The apparatus of claim 20, wherein the network credential for the device comprises a private-public key pair provisioned by a device manufacturer.

24. The apparatus of claim 20, further comprising:
means for sending a device registration confirmation message to the UE upon registering the device.

25. The apparatus of claim 20, wherein means for registering the device comprises:
means for sending registration information to a home subscriber server (HSS) of the UE to be added to a device subscription list stored at the HSS, wherein the registration information comprises the identification information and the network credential for the device.

26. The apparatus of claim 20, wherein the identification information for the device comprises at least one of:
a device identifier, device parameters, a uniform resource locator (URL), a shared key, a public key, or a public key certificate of the device, or any combination thereof.

27. The apparatus of claim 20, wherein means for registering the device comprises:
means for providing a network entity with access restrictions for the device.

28. The apparatus of claim 27, wherein the access restrictions comprise at least one of:
access time duration limits, time of use specifications, maximum bandwidth limits, service parameters, uplink throughput limits, or downlink throughput limits, or any combination thereof.

29. The apparatus of claim 20, further comprising:
means for receiving an authentication request for the device from the UE via the connection; and
means for sending an authentication acknowledgement for the device to the UE via the connection.

30. The apparatus of claim 20, wherein the identification information for the device is of a different kind than the network credential of the UE.

31. The apparatus of claim 20, wherein the network credential of the UE is provisioned by an operator of the wireless network and the identification information for the device is established by a manufacturer of the device.

32. An apparatus for wireless communication, comprising:
means for obtaining identification information for a device that lacks credentials for accessing a wireless network, wherein the device is a physical hardware device that is separate from the apparatus;
means for establishing a connection with the wireless network based on a network credential of the apparatus;
means for sending the identification information to a network server over the connection to associate, at the network server, the identification information for the device with the network credential of the apparatus;
means for sending an authentication request for the device to the network server for authentication via a device authentication server; and
means for managing a subscription for the device on the wireless network, wherein wireless access for the device on the wireless network is established independently of the apparatus.

33. The apparatus of claim 32, further comprising:
means for establishing a local communication link with the device, wherein the means for obtaining are operative to obtain the identification information over the local communication link.

34. The apparatus of claim 32, further comprising:
means for receiving an authentication response for the device from the network server via the connection.

35. An apparatus for wireless communication, comprising:
at least one processor;
memory in electronic communication with the at least one processor; and
instructions stored in the memory and operable, when executed by the at least one processor to cause the apparatus to:
establish a connection with a user equipment (UE) based on a network credential of the UE;
obtain identification information from the UE for a device that lacks credentials for accessing a wireless network, wherein the device is a physical hardware device that is separate from the UE;
send a message to a device authentication server;
authenticate the identification information for the device via the device authentication server;
register the device for access to the wireless network with a network credential for the device that is different from the network credential of the UE after authenticating the identification information for the device, the registering comprising associating the identification information for the device with the network credential of the UE; and
receive a request for access from the device, the request for access being independent of the UE subsequent to registering the device for access to the wireless network.

36. The apparatus of claim 35, the instructions being operable to cause the apparatus to:
receive a response from the device authentication server, wherein the authentication of the identification information is based on the response from the device authentication server.

37. The apparatus of claim 35, wherein the network credential for the device comprises a shared key provisioned by a device manufacturer.

38. The apparatus of claim 35, wherein the network credential for the device comprises a private-public key pair provisioned by a device manufacturer.

39. The apparatus of claim 35, the instructions being operable to cause the apparatus to:
send a device registration confirmation message to the UE upon registering the device.

40. The apparatus of claim 35, the instructions being operable to cause the apparatus to:
send registration information to a home subscriber server (HSS) of the UE to be added to a device subscription list stored at the HSS, wherein the registration information comprises the identification information and the network credential for the device.

41. The apparatus of claim 35, wherein the identification information for the device comprises at least one of:
a device identifier, device parameters, a uniform resource locator (URL), a shared key, a public key, or a public key certificate of the device, or any combination thereof.

42. The apparatus of claim 35, the instructions being operable to cause the apparatus to:
provide a network entity with access restrictions for the device.

43. The apparatus of claim 42, wherein the access restrictions comprise at least one of:
access time duration limits, time of use specifications, maximum bandwidth limits, service parameters, uplink throughput limits, or downlink throughput limits, or any combination thereof.

44. The apparatus of claim 35, the instructions being operable to cause the apparatus to:
receive an authentication request for the device from the UE via the connection; and
send an authentication acknowledgement for the device to the UE via the connection.

45. The apparatus of claim 35, wherein the identification information for the device is of a different kind than the network credential of the UE.

46. The apparatus of claim 35, wherein the network credential of the UE is provisioned by an operator of the wireless network and the identification information for the device is established by a manufacturer of the device.

47. The apparatus of claim 35, wherein the identification information for the device comprises a global unique network identifier.

48. The apparatus of claim 35, the instructions being operable to cause the apparatus to:
receive a deregistration request for the device;
approve the deregistration request; and
remove access for the device based at least in part on approving the deregistration request.

49. An apparatus for wireless communication, comprising:
at least one processor;
memory in electronic communication with the at least one processor; and
instructions stored in the memory and operable, when executed by the at least one processor, to cause the apparatus to:
obtain identification information for a device that lacks credentials for accessing a wireless network, wherein the device is a physical hardware device that is separate from the UE;
establish a connection with the wireless network based on a network credential of the apparatus;
send the identification information to a network server over the connection to associate, at the network server, the identification information for the device with the network credential of the apparatus;
send an authentication request for the device to the network server for authentication via a device authentication server; and
manage a subscription for the device on the wireless network, wherein wireless access for the device on the wireless network is established independently of the apparatus.

50. The apparatus of claim 49, the instructions being operable to cause the apparatus to:
establish a local communication link with the device, wherein the identification information for the device is obtained over the local communication link.

51. The apparatus of claim 49, the instructions being operable to cause the apparatus to:
receive an authentication response for the device from the network server via the connection.

52. The apparatus of claim 49, wherein the wireless access parameters comprise a global unique network identifier.

53. The apparatus of claim 49, the instructions being operable to cause the apparatus to:
send a deregistration request for the device to the network server.

54. A non-transitory computer-readable medium storing code for wireless communication, the code comprising instructions executable to:
establish a connection with a user equipment (UE) based on a network credential of the UE;
obtain identification information from the UE for a device that lacks credentials for accessing a wireless network, wherein the device is a physical hardware device that is separate from the UE;
send a message to a device authentication server;
authenticate the identification information for the device via the device authentication server;
register the device for access to the wireless network with a network credential for the device that is different from the network credential of the UE after authenticating the identification information for the device, the registering comprising associating the identification information for the device with the network credential of the UE; and
receive a request for access from the device, the request for access being independent of the UE subsequent to registering the device for access to the wireless network.

55. A non-transitory computer-readable medium storing code for wireless communication, the code comprising instructions executable to:
obtain identification information for a device that lacks credentials for accessing a wireless network;
establish a connection with the wireless network based on a network credential of a user equipment (UE), wherein the device is a physical hardware device that is separate from the UE;

send the identification information to a network server over the connection to associate, at the network server, the identification information for the device with the network credential of the UE;

send an authentication request for the device to the network server for authentication via a device authentication server; and managing a subscription for the device on the wireless network, wherein wireless access for the device on the wireless network is established independently of the UE.

\* \* \* \* \*